(12) United States Patent
Kang

(10) Patent No.: US 10,325,208 B2
(45) Date of Patent: Jun. 18, 2019

(54) RELATIONAL MULTI-LEVEL TREE SYSTEMS

(71) Applicant: Cheng Kang, Singapore (SG)

(72) Inventor: Cheng Kang, Singapore (SG)

( * ) Notice: Subject to any disclaimer, the term of this patent is extended or adjusted under 35 U.S.C. 154(b) by 762 days.

(21) Appl. No.: 14/429,785

(22) PCT Filed: Jul. 29, 2013

(86) PCT No.: PCT/SG2013/000317
§ 371 (c)(1),
(2) Date: Mar. 20, 2015

(87) PCT Pub. No.: WO2014/046612
PCT Pub. Date: Mar. 27, 2014

(65) Prior Publication Data
US 2015/0248614 A1    Sep. 3, 2015

(30) Foreign Application Priority Data
Sep. 24, 2012   (WO) ................ PCT/SG2012/000356

(51) Int. Cl.
G06N 5/04        (2006.01)
G06Q 30/02       (2012.01)

(52) U.S. Cl.
CPC ............. *G06N 5/04* (2013.01); *G06Q 30/02* (2013.01)

(58) Field of Classification Search
CPC ................ G06N 5/04; G06Q 30/02–30/0284
(Continued)

(56) References Cited

U.S. PATENT DOCUMENTS

2008/0221994 A1   9/2008  Rutz et al.
2010/0063877 A1*  3/2010  Soroca ............... G06Q 30/0246
                                                      705/14.45
2010/0076830 A1   3/2010  Huhem et al.

FOREIGN PATENT DOCUMENTS

WO        2007131335 A1   11/2007

OTHER PUBLICATIONS http://www.bowdoin.edu/~ltoma/teaching/cs210/spring09/Slides/210-Trees.pdf, csci210: Data Structures, Spring 2009, pp. 1-41.*
(Continued)

*Primary Examiner* — John Van Bramer
(74) *Attorney, Agent, or Firm* — Horizon IP PTE Ltd; Dexter Kam Chin

(57) ABSTRACT

Born To Live is use for mitigating obstacles of exponential broadening base logic, inherent in multi-levels tree formation systems, to deriving Pareto efficient system solutions for scheduling fair leveraging treatment frequencies. The disclosed intellectual property know-how is use for working with pools of leveraging contributors, starting with the minimum age of eighteen (18) year old, to applying age ranges interval tabulations, whereby forming Born To Live relational multi-levels tree formation systems. It instructs pre-sorting of leveraging contributors' position assignments sequences base on age's priorities order. Guided by a levels strengths analysis chart constructed, it instructs the formation of adjacent optimal multi-levels trees, for managing obstacles of the next insurmountable incremental in multi-levels tree formation systems. It also instructs periodically re-scheduling fair leveraging assignments for leveraging contributors, during subsequent contributors' age advancements, whereby assigning each leveraging contributor into a new position throughout Born To Live relational multi-levels tree formation systems, and to finally graduating (Continued)

Figure 2:
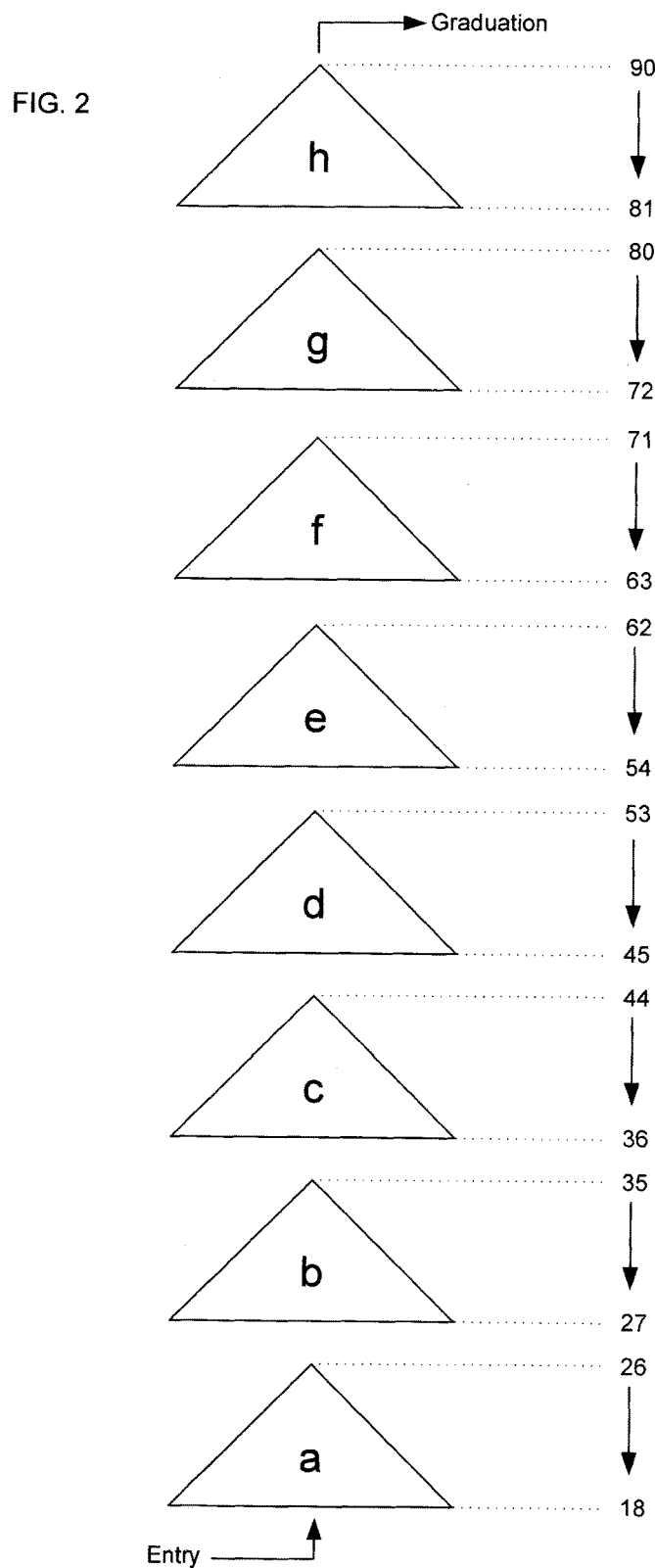

leveraging contributors out of the multi-levels tree formation systems itself.

20 Claims, 8 Drawing Sheets

(58) Field of Classification Search
USPC .............................................. 705/14.1–14.73
See application file for complete search history.

(56) References Cited

OTHER PUBLICATIONS http://www.bowdoin.edu/~ltorna/teaching/cs210/spring09/Slides/210-Trees.pdf, csci210: Data Structures, Spring 2009, pp. 1-41 (Year: 2009).*

Geanakoplos John et al., Leverage, Incomplete Markets and Pareto Improving Regulation, http://crei.eu/activities/crei_seminar/05-06/kubler.pdf, Nov. 10, 2005, 16 pages.

Chunhua Ju et al., Attritbute-based multi-branch-Bayesian network-based distributed client order model, Management World, 2010, pp. 175-176 and 185, 01, China Academic Journal Electronic Publishing House.

* cited by examiner

FIG. 1

Age Ranges Interval Tabulations

| Age Ranges Interval Tabulations | Range | Period |
| --- | --- | --- |
| Age range interval tabulation h: | 81 - 90 | 9 years |
| Age range interval tabulation g: | 72 - 80 | 9 years |
| Age range interval tabulation f: | 63 - 71 | 9 years |
| Age range interval tabulation e: | 54 - 62 | 9 years |
| Age range interval tabulation d: | 45 - 53 | 9 years |
| Age range interval tabulation c: | 36 - 44 | 9 years |
| Age range interval tabulation b: | 27 - 35 | 9 years |
| Age range interval tabulation a: | 18 - 26 | 9 years |

FIG. 5

Level's Strengths Analysis Chart

| Level | Level's Strength | Accumulative Strengths |
|---|---|---|
| 0 | 1 | 1 |
| 1 | 5 | 6 |
| 2 | 25 | 31 |
| 3 | 125 | 156 |
| 4 | 625 | 781 |
| 5 | 3,125 | 3,906 |
| 6 | 15,625 | 19,531 |
| 7 | 78,125 | 97,656 |
| 8 | 390,625 | 488,281 |
| 9 | 1,953,125 | 2,441,406 |
| 10 | 9,765,625 | 12,207,031 |
| 11 | 48,828,125 | 61,035,156 |
| 12 | 244,140,625 | 305,175,781 |

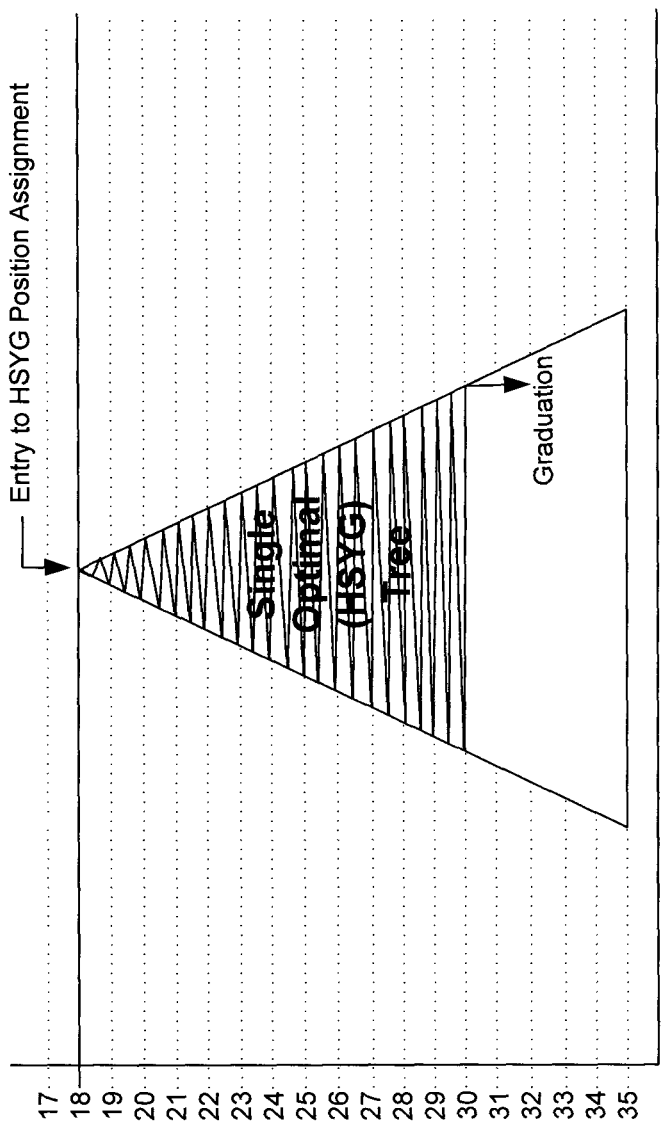

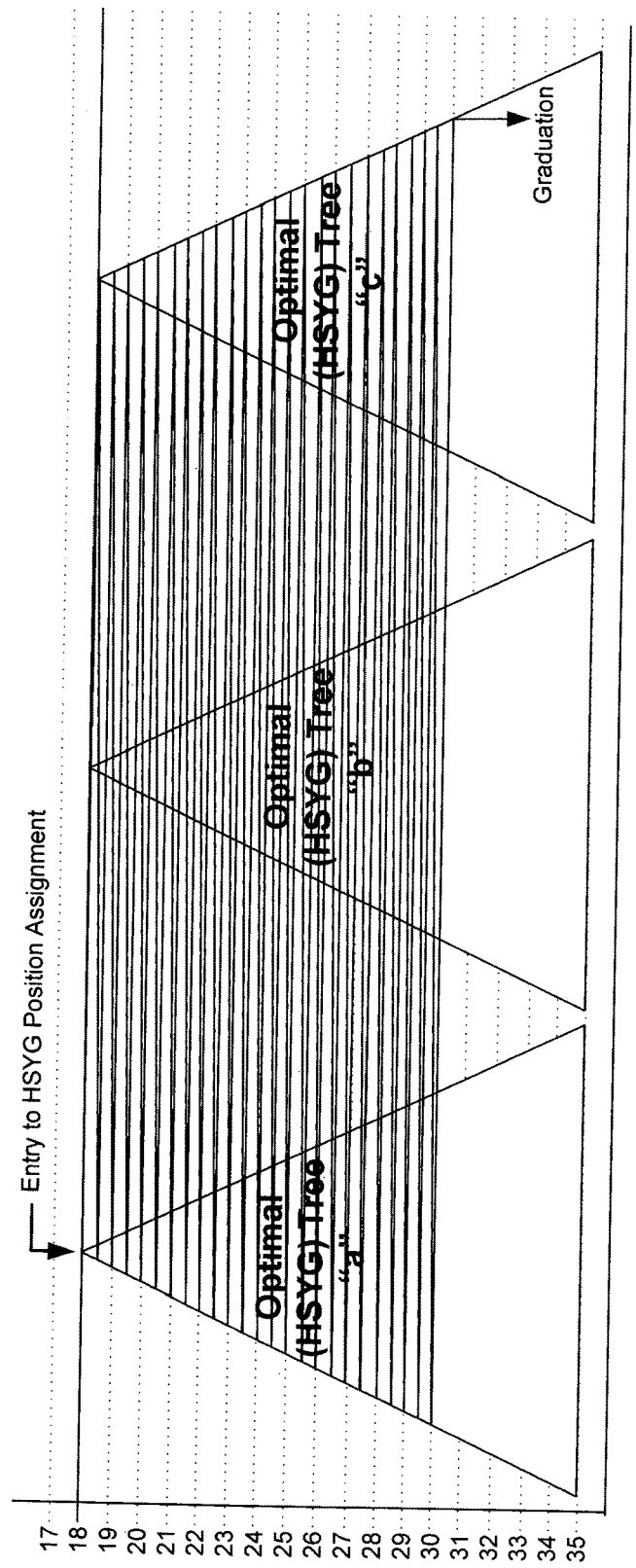

RELATIONAL MULTI-LEVEL TREE SYSTEMS

INTRODUCTION

Here in, disclosing intellectual property know-how: Born To Live; is use for mitigating obstacles of exponential broadening base logic, inherent in multi-levels tree formation systems, to deriving Pareto efficient system solutions for scheduling fair leveraging treatment frequencies.

The disclosing intellectual property know-how is use for working with pools of leveraging contributors, starting with the minimum age of eighteen (18) year old, to applying age ranges interval tabulations, and to forming typical Born To Live relational multi-levels tree formation systems.

In order to mitigate obstacles of exponential broadening base logic, inherent in multi-levels tree formation systems, the disclosing intellectual property know-how instructs applying periodical re-assigning of each leveraging contributor into a new position. Whereby these periodical position re-assignments performed during subsequent contributors' age advancements, would release every leveraging contributor from respective contributing positions, to resume respective scheduled qualifying positions.

In order to manage obstacles of next insurmountable incremental in multi-levels tree formation systems, the disclosing intellectual property know-how instructs the constructing of adjacent optimal multi-levels tree formations, having guided by a levels strengths analysis chart constructed.

In order to construct the desired adjacent optimal multi-levels tree formation systems, the disclosing intellectual property know-how instructs applying of both top/down and adjacent-top/down position's assignment patterns, whereby assigning leveraging contributors into Born To Live relational multi-levels tree formation systems.

After every leveraging contributor having gone through respective interval years of scheduled qualifying periods fair leveraging assignments, they would be finally graduating out of the multi-levels tree formation systems at the final year of age advancement reassignments.

PRIOR ART

No former patented prior art known to have processes similar characteristics to current disclosing art. Nonetheless to date, overcoming obstacles of exponential broadening base logic, inherent in multi-levels tree formation systems had remain a near-impossible to any forms of known prior art.

Please see descriptions in disclosure section for: What is obstacle of exponential broadening base logic, inherent in multi-levels tree systems?

Descriptions of Related Arts that does not Process Similar Characteristics to Current Disclosing Art Multi-Levels Arts (MLA)

MLA is a form of art originated from ancient Egypt whereby constructions of four dimensional polygons begin with the bottom, after having determined the base area of the pyramid. Multi-levels tree formations is an art of applying logical increase in exponential base entities in a top-down manner, usually starting with the first entity to configuring multiple parents and child relationship in multi-levels tree formation systems. The physics of exponential increase in base entities within multi-levels tree systems is practically inexhaustible.

Notably the use of MLA engineering in multi-levels tree formations could be found in many parts of societies, from formation of organizational structure, to businesses distribution channels, to commissions overriding schemes, to networking topologies and to families' tree history records and so on . . . .

Commonly all MLA practices do not required to determine the maximum base levels' limits of exponential base increases, however any attempt to determine the maximum base levels' limits of exponential base increases in multi-levels trees could be near impossible.

To date, no one on Earth has yet to overcome obstacles of exponential broadening base effects, inherent in multi-levels tree formation systems. Therefore, exponential base increases in multi-levels tree formations always remain an interesting open-ended subject with physics of insurmountable exponential base increases.

MLA Used in Multi-Levels Marketing

Multi-levels Marketing (MLM) schemes are forms of auditable and accountable direct selling business mechanisms, that simulate exclusive end-consumers' products sales networking. Most MLM businesses targeting exclusive products networking sales would design forms of MLM commission payout schemes involving MLA, whereby employing the synergy of leveraging to derive accumulative rewards payout out to associated business operation partners.

Power of leveraging is to having two or more levels of exponential strengths incremental in child entities contributing toward a parent entity. Nonetheless, power of leveraging could often be miss-understood and described by many holding position of advantages at the top of multi-levels tree systems as promising. Technically all multi-levels tree systems have broadening bases that would get larger at each level downwards, filling the endless exponential broadening base of multi-levels tree systems with child entity assignments could be inexhaustible. Given if matters of exponential broadening base effects could not be mitigated with a sounded solution, then qualifying minority entities at the top of multi-levels tree systems with child assignments contributions could often generate unfair leveraging treatment frequencies.

Given the filling of the exponential base entities gets bigger and slower at each level downwards, other than easily qualifying those at the top of multi-levels tree systems with a relative minority individuals receiving qualifying benefits, more would be needed and waiting at the base of multi-levels tree systems, whereby minority at the top indefinitely hold on to advantage's position.

Basing on products networking performances and frequencies of leveraging harvesting, many conventional and advance MLA alike often tend to post disproportion benefits rewarding results. When the system become unstable or unsustainable, given challenged by fear competitions, frequencies of leveraging harvesting could end up with unfair exploitations of late comers, these could include those who have worked very hard at the beginning to establish own advantage's position, risk un-promised long-term benefits. This is because the sustainable bases of MLM need to be ever replenished, as non-performing trees and branches diminished from time to time.

Power of leveraging is only promising provided, the gaining of exponential momentums or contribution strengths could be absolutely made sustainable, and at the same time fulfilling requirements of Pareto efficiencies. Otherwise Power of leveraging could also be easily reversible, brought about by unfavourable conditions. This is especially when such systems become unsustainable or degraded overtime due to unpredictable or poor performances.

Although sustainability auditing had long challenged many MLA engineering, but none processes sounded solution of any kinds have claimed to overcome obstacles of exponential broadening base logic, inherent in multi-levels tree systems. Nonetheless these obstacles do not boarder MLM companies, as most of MLM businesses' objectives were driven by frequencies leveraging harvesting schemes. These frequencies leveraging harvesting schemes were meant only for the sole purpose of administrating commission payouts to, not possibly all individuals in societies, but to a handful of direct-selling operators, whom could qualify them from time to time.

These are common technical setbacks of exponential broadening base logic in multi-levels tree systems, as most MLA would rather decisively ignore these obstacles to working with inherent open-ended broadening base logic in the system. It is evidences that many advance MLA engineering attempting to harness the Power of leveraging were not capable of delivering, a Pareto efficient system of scheduling fair leveraging treatment frequencies, let alone there were no prior requirements to fulfil any Pareto efficiencies working with targeted MLA engineering requirements.

Absents of comprehending the intellectual know-how in managing obstacles of exponential broadening base logic, inherent in multi-levels tree systems could be commonly witnessed in: —
a) random age formation of multi-levels tree systems,
b) leveraging contributions were mainly derived and driven by sales frequencies,
c) working with unpredictable contributors' attempts,
d) inability to deliver constant predicable contributions from time to time,
e) leveraging with inconsistent Power of leveraging from time to time,
f) lacking sustainable scale of critical masses (at times),
g) inability to relief contributors from unfavourable position,
h) inability to schedule distributions of fair treatment frequencies,
i) and living on with endlessly open-ended broadening base logic in the system without a solution.

Common characteristics of MLA
a) All MLA systems including multi-levels marketing scheme systems are characterized by having endless open-ended broadening base logic inherent in the multi-levels tree system.
b) All MLA systems have no ability to increase the numbers of benefiting positions without relatively increasing the size of the multilevels tree system.
c) All MLA systems are characterized by having position holders in the multi-levels tree system permanently wedged onto an initial assigned position.
d) When such initial assigned position become unfavourable to the position's holder, all MLA systems have no ability to enable holders of position to be subsequently re-assigned into a new position or move upward, or graduated out from the entire multi-levels tree system.
e) All MLA systems have no knowledge of working with distributed chains of relational sub-multi-levels tree tabulations, let alone commonly seen working within a single contact of large independent multi-levels tree system inherent with endless broadening base.

Orthodoxy of MLA concept was thought by many to be incomprehensible solutions. Harnessing Power of leveraging with multi-levels tree systems remain a cynical idea, nonetheless these perceptions were true as not all MLA works were deem Pareto efficient. Prior to the disclosure of Born To Live intellectual property know-how, no known MLA have claimed to derive workable solution of any kinds for mitigating obstacles of exponential broadening base logic, inherent in multi-levels tree systems. This could be due to overcoming obstacles of exponential broadening base logic in multi-levels tree formation systems is a near impossible.

Ponzi Scheme

Although ponzi scheme is not a form of transparent or legitimate art, but it uses some forms of multi-levels exploitations. As far as the applicant's known knowledge is concerned, the applicant is obligated to mention them here.

Ponzi scheme is characterized by formulating a fraudulent business' investment scheme riding on some forms of business like investment objectives that would otherwise pay a minority pool of receivers or investors with illogically high returns. Given the endlessly recycling of resources from majority pools of new comers or investors, it is usually done in a non-transparent manner without the contributors' or investors' knowledge on how these returns are deriving from the business operations.

Other than capable of describing the true nature of it business objective in details, the nature of ponzi scheme is to claiming a "business-like investment vehicle". Such scheme often misleading investors or contributors into thinking that high returns derive from the presented forms of business investment vehicle are viable "secret investment instrument".

Common characteristics of ponzi schemes
1) Ponzi schemes have no ability set out to explain in full details, the true logic of its business operations or deliver any forms of sound transparency that could be vetted by experts and professionals in the related business arena.
2) Ponzi schemes have no ability to deliver predicable scheduled returns to its pool of contributors or investors due to resources coming from new comers could be unpredictable.
3) Ponzi schemes also have no ability to ensure every contributor or investor within the geometric progression could go through fair leveraging treatment assignments at any one time.
4) Other than endlessly employing some forms of multi-level structural exploitations on new corners, ponzi schemes have absolutely no substance to enable every contributor or investor within the geometric progression to effectively leverage on each others' contribution strengths.
5) Ponzi schemes are known to be worst in term of Pareto efficient.

Disclosure of Born to Live Intellectual Property Know-How

What are Obstacles of Exponential Broadening Base Logic Inherent in Multi-Levels Tree Systems?

Traditionally all multi-levels tree systems have broadening base entities that could get larger at each level downwards, any attempt to determine the maximum base limits of exponential broadening base increases could be near impossible. The physics of exponential increase in base entities within multi-levels tree systems are practically inexhaustible. Filling the endless exponential broadening base of multi-levels tree formation systems with child entity assignments could require more than the world's populations.

Any attempt to accord fair treatment frequencies to all fixed-position child entities within multi-levels tree formation systems could inevitably generate insurmountable obstacles of inefficient distributions of fair leveraging treatments. This is due to the physics of ever enlarging base entities in multi-levels tree systems, especially when encountering with the next level of insurmountable exponential incremental. Beside obstacles of exponential broadening base logic, obstacles of the next insurmountable exponential incremental is also known to exist inside multi-levels tree formation systems. Beside, none has claimed or instructed solution of any kinds for mitigating obstacles of exponential broadening base logic, inherent in multi-levels tree formation systems.

Follow these Steps to Recreate the Effects of Obstacles of Exponential Broadening Base Logic, Inherent in Multi-Levels Tree Systems Create a table of three columns.
Label column one: Level
Label column two: Level's Strength
Label column three: Accumulative Strengths
Input column: one, "Level" from 0 to 14
Input column: two, "Level's Strength" with 1 and multiply each row downwards by 5
Input column: three, "Accumulative Strengths" by adding the accumulative sum of column: two
Completed the above steps would create a table as follow:—

| Level | Level's Strength | Accumulative Strengths |
| --- | --- | --- |
| 0 | 1 | 1 |
| 1 | 5 | 6 |
| 2 | 25 | 31 |
| 3 | 125 | 156 |
| 4 | 625 | 781 |
| 5 | 3,125 | 3,906 |
| 6 | 15,625 | 19,531 |
| 7 | 78,125 | 97,656 |
| 8 | 390,625 | 488,281 |
| 9 | 1,953,125 | 2,441,406 |
| 10 | 9,765,625 | 12,207,031 |
| 11 | 48,828,125 | 61,035,156 |
| 12 | 244,140,625 | 305,175,781 |
| 13 | 1,220,703,125 | 1,525,878,906 |
| 14 | 6,103,515,625 | 7,629,394,531 |

Notably at level: 14 only, the accumulative strengths of 7,629,394,531 in column: three had already exited the world population figures, and from level: 14 downward the exponential broadening base logic would get five times as big as the previous' level with practically no ending.

What are Obstacles of the Next Insurmountable Exponential Incremental?

Problems with exponential broadening base logic is the exponential incremental would get bigger at each level downwards. It may even start off with the smallest exponential incremental of two, but it could come to a point of encounter whereby the next level incremental could result in obstacles of the next insurmountable exponential incremental. Therefore, obstacles of the next insurmountable exponential incremental also existed in multi-levels tree formation systems. The insurmountable increases in each level downwards could render the slowing down of the multi-level tree formation, whereby assigning the next level of child entities. The slowing down effects could get so slowed that it is non-practical.

Follow these Steps to Recreate the Effects of Obstacles of the Next Insurmountable Exponential Incremental Create a table of three columns.
Label column one: Level
Label column two: Level's Strength
Label column three: Accumulative Strengths
Input column: one, "Level" from 0 to 13
Input column: two, "Level's Strength" with 1 and multiply each row downwards by 5
Input column: three "Accumulative Strengths" by adding the accumulative sum of column: two
Completed the above steps would create a table as follow:—

| Level | Level's Strength | Accumulative Strengths |
| --- | --- | --- |
| 0 | 1 | 1 |
| 1 | 5 | 6 |
| 2 | 25 | 31 |
| 3 | 125 | 156 |
| 4 | 625 | 781 |
| 5 | 3,125 | 3,906 |
| 6 | 15,625 | 19,531 |
| 7 | 78,125 | 97,656 |
| 8 | 390,625 | 488,281 |
| 9 | 1,953,125 | 2,441,406 |
| 10 | 9,765,625 | 12,207,031 |
| 11 | 48,828,125 | 61,035,156 |
| 12 | 244,140,625 | 305,175,781 |
| 13 | 1,220,703,125 | 1,525,878,906 |
| 14 | 6,103,515,625 | 7,629,394,531 |

Given the need to assign every levels of child entities with child entity of their own, notably after level: 11, level: 12 would take five times as many child entities than level: 11 to fulfil, and at each and every level downwards the obstacle of the next insurmountable incremental would get 5 times as big and 5 times as slow to fulfil.

What is a True Logic Leveraging System (TLLS)?

Leveraging is pooling of contributors to empowering one another by one or more levels of exponential contributions. A true logic leveraging system is a pooling of contributors' strengths in order to realize the power of leveraging. However not any leveraging systems could simply qualify a True Logic Leveraging System (TLLS) without first fulfilling Pareto efficient requirements.

Listed here are some of the unique characteristic requirements a True Logic Leveraging System (TLLS) must fulfil other than Pareto efficient alone:— a) A TLLS must be recordable, accountable and auditable in any forms of illegal accounting systems.
b) A TLLS must be able to first accord every contributor equal chance of receiving benefits and at the same time taking respective turn to equally contribute back the respective base resources.
c) A TLLS must also fulfil no one owes anybody, any leveraging credits they consumed fairly.
d) A TLLS must be compliance with directing leveraging resources solely to leveraging purposes and not exposing its pools of leveraging resources to external risks.
e) A TLLS must not invest its' pools of leveraging resources outside the box, in order to maximize the value of its pooled resources.
f) A TLLS must not directly benefit from the pool of leveraging resources it is managing, except charging a nominal administration fee.

Only a True Logic Leveraging System (TLLS) could mobilize the pooling of contributors' strengths to realize the power of leveraging and not mobilize too much of the contributors' personal commitments, therefore freeing the individuals' time to concentrate on self-improvement and other productive activities. There could be little for True Logic Leveraging communities' need to do or must do, except faithfully maintaining respective regular subscriptions, while waiting transparently for one to be eventually assigned into respective qualifying turn of receiving due leveraging assignments.

Born to Live Inventive Steps

Disclosing said intellectual property know-how for creating Born To Live multi-levels tree formation systems that is capable of unlocking the legitimate power of leveraging, by instructing out the necessary know-how solutions for mitigating obstacles of exponential broadening base logic, inherent in multi-levels tree formation systems.

Inventive Step: 1

Creating the Born to Live Relational Multi-Levels Tree Database Information.

To create Born To Live relational multi-levels tree formation systems, setup a copy of leveraging contributors' database information.

Inventive Step: 2

Determine the Desired Age Ranges Interval Tabulations.

In order to avoid random age formation of multi-levels tree systems and to schedule qualifying leveraging assignments at different intervals of the multi-levels tree formation systems. Born To Live intellectual property know-how instructs, starting with the minimum age of eighteen (18) year old, tabulate the desired age ranges interval tabulations for the relational multi-levels tree formation systems.

Following example illustrate a typical age range interval tabulation of 9 years period.

| Age Ranges Interval Tabulations | Range | Period |
| --- | --- | --- |
| Age range interval tabulation h: | 81-90 | 9 years |
| Age range interval tabulation g: | 72-80 | 9 years |
| Age range interval tabulation f: | 63-71 | 9 years |
| Age range interval tabulation e: | 54-62 | 9 years |
| Age range interval tabulation d: | 45-53 | 9 years |
| Age range interval tabulation c: | 36-44 | 9 years |
| Age range interval tabulation b: | 27-35 | 9 years |
| Age range interval tabulation a: | 18-26 | 9 years |

Please see descriptions of drawings for FIG. 1 drawing: 1/8 for typical Age Ranges Interval Tabulations.

Inventive Step: 3

Pre-Sorting of Contributors' Position Assignment Sequences in the Leveraging Contributors' Database Information.

Due to assigning huge volume of contributors' database information into multi-levels tree systems could be quite time consuming, the task of assigning contributors into the multi-levels tree systems should be delegated to a computer developed software application, for managing the disclosed intellectual property know-how systems.

Before a logic instructed computer program periodically assigns active leveraging contributors with a position into Born To Live distributed chains of relational multi-levels tree systems. The leveraging administrator replicating the disclosed intellectual property know-how, would have to instructs the pre-sorting of all active leveraging contributors' in the database information into a separate position's prioritized contributor database information, with the help of a database application development programmer. These instructed processes is called position assignment prioritizing process.

Born To Live instructed position assignment prioritizing process could pre-sort active leveraging contributors database information according to the following desire order:— a) To schedule priority for fair leveraging treatment assignments based on oldest age first, the position assignment prioritizing process pre-sort contributors' position assignment sequences according to oldest birth-date, birth-time and online system registration-time priorities.

b) To schedule priority for fair leveraging treatment assignments based on youngest age first, the position assignment prioritizing process pre-sort contributors' position assignment sequences according to youngest birth-date, birth-time and online system registration-time priorities.

These instructed position assignment prioritizing processes would be periodically performed during subsequently contributors' age advancement. During the position assignment prioritizing process, a unique assignment serial number would be tagged onto every pre-sorted position in the position's prioritized contributor database information for verification purposes.

Inventive Step: 4

Resolving Position Assignment Priorities' Conflicts for Two or More Contributors Having the Same Birth-Date and Birth-Time.

Given if two or more contributors having the same birth-date and birth-time is encountered, Born To live instructs an earliest online system registrations-date-time indicator is to be used for resolving any assignment priority conflict.

Inventive Step: 5

Determine the Contributor Strengths.

Contributor strengths are the numbers of collective child contributors assignments assigned to each leveraging contributor. If the working contributor strength of the leveraging system is pre-determined to be five (5), then each active contributor would be assigned five (5) child contributor assignments.

The leveraging operations administrator replicating the disclosed intellectual property know-how would have to pre-determine the contributor strengths parameters, to be instructed, or to be inputted into a computer developed software application for managing the disclosed intellectual property know-how systems.

Inventive Step: 6

Determine the Contributor Weights.

Contributor weights are levels of child assignments pre-determined to qualify a leveraging contributor for full leveraging assignments.

If one (1) level of contributor weights is pre-determined, then each active contributor could only be computed for a full qualifying leveraging assignments basing on five (5) collective strengths of child contributor assignments, which constitutes one (1) level of contributor weights.

Given if two (2) levels of contributor weights is pre-determined, then each active contributor could be computed for a full qualifying leveraging assignments basing on a total of thirty (30) collective strengths of child contributor assignments, which constitute the strength of five (5) contributors in the qualifying contributor's level: 1 assignments and twenty-five (25) contributors in the qualifying contributor's level: 2 assignments.

The leveraging operations administrator replicating the disclosed intellectual property know-how would also have to pre-determine the contributor weights parameters, to be instructed, or to be inputted into a computer developed software application for managing the disclosed intellectual property know-how systems.

Inventive Step: 7

Constructing the Level's Strengths Analysis Chart.

A level's strengths analysis chart is to be constructed base on the contributor strengths pre-determined. It has two important functions in the disclosure of Born To Live intellectual property know-how:— a) It is use for helping to guide, and to pre-determine the optimal level: 0's strength selected from the level's strengths analysis chart, for creating typical Born To Live Plateau's shape multi-levels tree formation systems.

b) It is also use for managing obstacles of the next insurmountable exponential incremental in multi-levels tree formation systems, to construct the numbers of adjacent optimal age range tabulations within respective age range interval tabulations, whereby specifying the numbers of levels of optimal net accumulative strengths from the level's strengths analysis chart.

Following example illustrate a typical level's strengths analysis chart basing on incremental of five (5).

| Level | Level's Strength | Accumulative Strengths |
|---|---|---|
| 0 | 1 | 1 |
| 1 | 5 | 6 |
| 2 | 25 | 31 |
| 3 | 125 | 156 |
| 4 | 625 | 781 |
| 5 | 3,125 | 3,906 |
| 6 | 15,625 | 19,531 |
| 7 | 78,125 | 97,656 |
| 8 | 390,625 | 488,281 |
| 9 | 1,953,125 | 2,441,406 |
| 10 | 9,765,625 | 12,207,031 |
| 11 | 48,828,125 | 61,035,156 |
| 12 | 244,140,625 | 305,175,781 |

Please see descriptions of drawings FIG. 5 drawing: 5/8 for a Born To Live Level's Strengths Analysis Chart basing on incremental of five The leveraging operations administrator replicating the disclosed intellectual property know-how would need to construct the desired level's strengths analysis chart for managing the disclosed intellectual property know-how systems, to select the optimal level: 0's strength parameters to be instructed, or to be inputted into a computer developed software application, for creating typical Born To Live Plateau's shape multi-levels tree formation systems.

The leveraging operations administrator would also need to use the constructed level's strengths analysis chart, to specify the numbers of levels of optimal net accumulative strengths parameters, to be instructed, or to be inputted into a computer developed software application, for the numbers of adjacent optimal age range tabulations to be constructed within respective age range interval tabulation.

Inventive Step: 8

Determine the Desired Optimal Level: 0's Strength of Respective Age Range Interval Tabulation, Guided by Using the Level's Strengths Analysis Chart Constructed.

Before a logic instructed computer program starts assigning pre-sorted leveraging contributors' position into Born To Live distributed chains of relational multi-levels trees. The leveraging operations administrator replicating the disclosed intellectual property know-how would have to identify the total numbers of contributors within respective age range interval tabulation, with the help of the database application development programmer, from the position prioritized contributor database information.

In order to determine the optimal numbers of oldest age contributors to be assigned at level: 0 of respective age range tabulation, these computed total numbers of contributors' information within respective age range interval tabulation, would then be compared with the level's strengths analysis chart to select the desired optimal level: 0's strength.

Mention in inventive step: 7, Level's Strengths Analysis. Chart. The leveraging operations administrator replicating the disclosed intellectual property know-how would then have to select the desired optimal level: 0's strength parameters and the assignment pattern for respective age range interval tabulation, namely: top/down or adjacent-top/down, to be instructed, or to be inputted into a computer developed software application for managing the disclosed intellectual property know-how systems.

Following descriptions illustrate the construction of typical optimal age range tabulation by pre-determined the desired optimal level: 0's strength of the age range tabulation.

To describe the construction of optimal age range tabulation. Illustrations here use age range interval tabulation: d in FIG. 4 drawing: 4/8, which age range fall between: 45 to 53. Illustrations here would also use FIG. 5 drawing: 5/8, Level's Strengths Analysis Chart.

Given level strength of 15,625 in level: 6 of the level's strengths analysis chart is selected to be the optimal level: 0's strength of age range tabulation: d. Instead of assigning age range tabulation: d with conventional level: 0s strength of one (1) prescribed in level: 0 of the level's strengths analysis chart, the logic instructed computer program would starts assigning 15,625 prioritized contributors as level: 0 of age range tabulation: d. This would result in minority accumulative strengths of: 3,906 from level: 0 to level: 5 shown in level's strengths analysis chart, effectively channelled to become base support of age range tabulation: d itself.

Inventive Step: 9

Assigning of Positions Prioritized Leveraging Contributors into Optimal Age Range Tabulations.

Following descriptions illustrate the assigning of position's prioritized leveraging contributors into optimal age range tabulations.

Note:

The actual assignment sequences usually start with age range interval tabulation: h for the whole relational multi-levels tree systems. Illustrations here use age range interval tabulation: d in FIG. 4 drawing: 4/8, which age range fall between: 45 to 53.

Given contributor strengths of five (5) and two (2) levels of contributor weights was pre-determined, and the desired optimal level: 0's strength of: 15,625 in level: 6 of the level's strengths analysis chart was selected to be the optimal level: 0 of age range tabulation: d. With the first position's prioritized contributor database information of respective age range interval tabulation, the logic instructed computer program, would sequentially assign 15,625 position's prioritized contributors as level: 0 into optimal age range tabulation: d in a top/down assignment pattern.

Next the logic instructed computer program would move down to level: 1 of the current age range tabulation to assign each level: 0's assigned contributors with five (5) child position's prioritized contributors. After assigning all level: 0's assigned contributors with five (5) child position's prioritized contributors each in level: 1, the logic instructed computer program would move down to level: 2 of the current age range tabulation to assign each level: 1's assigned contributor with five (5) child position's prioritized contributors each in level: 2.

The top/down assignment pattern would subsequently move down to assign every level of assigned child assignments with five (5) child position's prioritized contributors each. Before the logic instructed computer program move on to process the next subsequent age range interval tabulations, these would be performed until all position's prioritized contributors database information within age range tabulation: d are all assigned with According to the contributor strengths and weights pre-determined for qualifying leveraging contributors with full qualifying leveraging assignments and depending on the available prioritized contributors database information within respective age range interval tabulation. Each leveraging contributor may be partially assigned with only one (1), if not two (2) full levels of child and sub-child leveraging assignments.

After the logic instructed computer program finished assigning all prioritized contributors database information into respective age range interval tabulations; all others age range tabulations within respective age range interval tabulations alike, would form typical Plateau's shape multi-levels tree formation.

Figure 4:
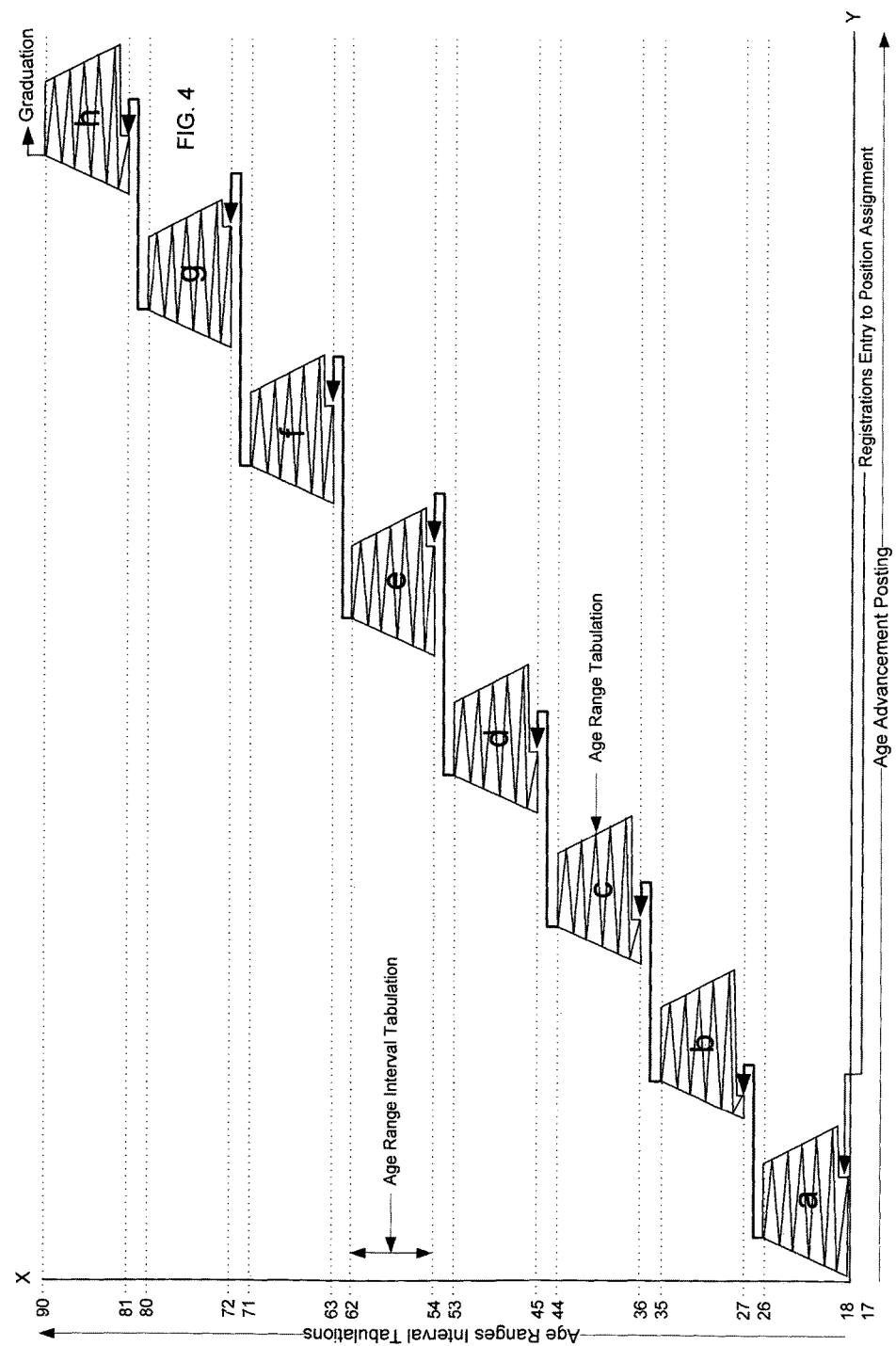

Please see FIG. 4 drawing: 4/8 for optimal multi-levels tree formation.

Inventive Step: 10

Determine the Numbers of Adjacent Optimal Age Range Tabulations to be Constructed within Respective Age Range Interval Tabulation.

Depending on the numbers of contributors' within respective age range interval tabulation, they could be further grouped into multiple adjacent optimal age range tabulation within respective age range interval tabulation.

Following descriptions illustrate the construction of adjacent optimal age range tabulation by pre-determined the numbers of adjacent optimal age range tabulation to be constructed within respective age range interval tabulation.

To describe processes of assigning prioritized leveraging contributors into adjacent optimal age range tabulations. Illustrations here would use age range interval tabulation: d in FIG. 6 drawing: 6/8, which age range fall between: 45 to 53. Illustrations here would also use FIG. 5 drawing: 5/8, Level's Strengths Analysis Chart.

Supposing the total numbers of computed contributors age between 45 to 53 within age range interval tabulation: d is 35,868,281. Given if the logic instructed computer program were to just assign all 35,868,281 position's prioritized contributors database information into age range tabulation: d01 in a top/down assignment manner, then at level: 11 it would requires 48,828,125 child assignments in order to qualify 9,765,625 contributors in level: 10 with only one level of child leveraging assignments.

Notably the figure: 48,828,125 had exited and is more than 100 percent of the total numbers of prioritized contributors in age range interval tabulation: d. Nonetheless the actual total numbers of contributors could be successfully assigned with two (2) full levels of qualifying leveraging assignments here is only, 488,281 at level: 8. This is term as "the next big lap" or otherwise obstacles of the next insurmountable exponential incremental that existed inside multi-levels tree formation systems.

Given particularly if age range interval tabulation: d have exceptionally large pool of leveraging contributors, they could be further grouped into d01, d02, d03, d04, d05 etc. . . . , forming adjacent optimal age range tabulations within age range interval tabulation: d.

Please refer to FIG. 5 drawing: 5/8 Level's Strengths Analysis Chart, notably that from level: 6 to level: 9, the net accumulative strengths were only 2,437,500, after minus away accumulative strengths of 3,906 from level: 0 to level: 5.

In this case, Born To Live intellectual property know-how instructs the total numbers of 35,868,281 computed contributors age between 45 to 53 within age range interval tabulation: d could first be divided by net accumulative strengths of 2,437,500 from level: 6 to level: 9 to determine the total numbers of adjacent optimal age range tabulations required within age range interval tabulation: d. Therefore, 35,868,281 divided by net accumulative strengths of 2,437,500 would give us around 14.7 adjacent optimal age range tabulation for age range interval tabulation: d.

Notably guided by the level's strengths analysis chart and specifying the numbers of adjacent optimal age range tabulation to be constructed within age range interval tabulation: d, the actual total numbers of contributors could be successfully assigned with two (2) full levels of qualifying leveraging assignments here is, 1,312,500. This could be calculated by taking 97,656 accumulative strengths in level: 7, minus away 3,906 accumulative strengths in level: 5, to multiply by 14.

Mention in inventive step: 7, Level's Strengths Analysis Chart. The leveraging operations administrator replicating the disclosed intellectual property know-how would have to specify the numbers of levels of optimal net accumulative strengths parameters, for the automatic functions of constructing adjacent optimal age range tabulation within respective age range interval tabulation, into a computer developed software application, for managing the disclosed intellectual property know-how systems.

Note:

Alternatively the leveraging operations administrator who has completely understood the complete systematic functions of the disclosed intellectual property know-how could relate all the understood requirements to the database application development programmer, to program all the necessary automatic detection computations and assignment functions needed at every level of age range interval tabulation, into the computer developed software application for managing the disclosed intellectual property know-how systems.

Given the pre-determined parameters for constructing the desired numbers of adjacent optimal age range tabulation within respective age range interval tabulation, with the first position's prioritized contributor database information the logic instructed computer program would sequentially assign 15,625 position's prioritized contributors as level: 0 for optimal age range tabulation: d01; followed by assigning another 15,625 position's prioritized contributors as level: 0 for adjacent optimal age range tabulation: d02 and followed for adjacent optimal age range tabulation: d03, d04, d05, etc., until adjacent optimal age range tabulation: d14.

After assigning all level: 0s of adjacent optimal age range tabulations from: d01 to d14 with 15,625 position's prioritized contributors each, the logic instructed computer program would move down to level: 1 of optimal age range tabulation: d01 to assign each level: 0's assigned contributor with five (5) child position's prioritized contributors each in level: 1, followed by moving over to level: 1 of adjacent optimal age range tabulation: d02 to assign each level: 0's assigned contributor with five (5) child position's prioritized contributors each in level: 1, and followed for adjacent optimal age range tabulation: d03, d04, d05, etc., until adjacent optimal age range tabulation: d14.

The adjacent-top/down assignment pattern would subsequent move over from adjacent optimal age range tabulation: d01 to d14 to assign every level of assigned child assignments with five (5) child position's prioritized contributors each. Before the logic instructed computer program move on to process the next subsequent age range interval tabulations, these would be performed until all 35,868,281 position's prioritized contributors in age range interval tabulation: d are all assigned with a due leveraging position within respective adjacent optimal age range tabulation.

According to the contributor strengths and weights predetermined for qualifying leveraging contributors with full qualifying leveraging assignments and depending on the available prioritized contributors database information within respective age range interval tabulation. Each leveraging contributor may be partially assigned with only one (1), if not two (2) full levels of child and sub-child leveraging assignments.

After the logic instructed computer program finished assigning all prioritized contributors database information into respective adjacent optimal age range tabulations; all others adjacent optimal age range tabulations within respective age range interval tabulations alike, would form typical adjacent Plateau's shape multi-levels tree formation.

Figure 6:
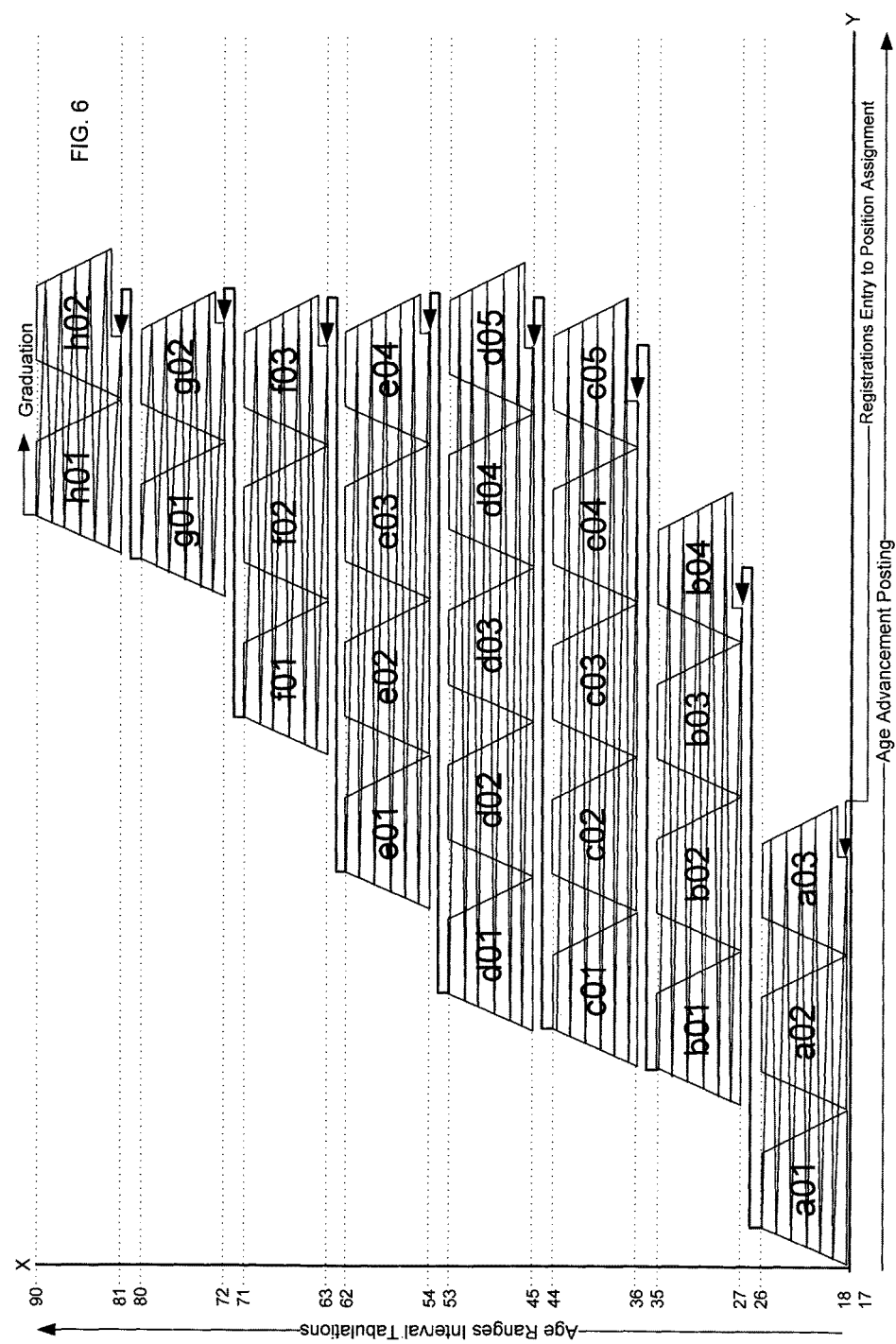

Please see FIG. 6 drawing: 6/8 for typical adjacent optimal multi-levels tree formation.

Inventive Step: 11

Managing Periodical Positions' Re-Assignment During Subsequent Contributors' Age Advancement.

In order to relief contributors assigned at the base of respective age range tabulations to gradually resuming qualifying positions. Born To Live instructs periodically apply position assignment prioritizing process for each and every leveraging contributor, during subsequent contributors' age advancement. So that younger age contributors could be released from their assigned position to takeover those qualifying positions, previously held by older age contributors.

To describe processes of periodical positions' re-assignment, illustrations here would use age range interval tabulation: g and h in FIG. 6 drawing: 6/8, which age range fall between: 72 to 80 and 81 to 90 respectively.

This is done by the position assignment prioritizing process during subsequent contributors' age advancement, whereby the process perform the re-sorting of remaining active leveraging contributors database information into a separate position's prioritized contributor database information.

Based on the pre-sorting order of the position assignment prioritizing process. When all leveraging contributors' age advance, the position assignment prioritizing process would automatic identify all the oldest age leveraging contributors at the top level of respective age range interval tabulations, to be those posting into the base of successive parent's age range interval tabulation. (For instance, all the age 80 leveraging contributors in age range interval tabulation: g would be posted into the base of parent age range interval tabulation: h given the contributor's age reached eighty-one (81) year old). These would similarly apply to every others age range interval tabulation.

When all oldest age leveraging contributors at the top of respective age range interval tabulation were posted upward into the base of respective parent's age range interval tabulation, during contributors' age advancement. Those leveraging contributors second oldest in age within the age range interval tabulation (for instance, all age: 79 leveraging contributors in age range interval tabulation: g) would be moving upward to be assigned a new position at the top of age range interval tabulation: g. These would similarly apply to every others age range interval tabulation.

Given the position assignment prioritizing process performed periodically, it would practically re-assign every leveraging contributor in the multi-levels tree systems into a new position and subsequently release every leveraging contributor from their contributing position, to resume respective scheduled qualifying positions.

Inventive Step: 12

Graduating Leveraging Contributors Out of Born to Live Multi-Levels Tree Formation Systems.

In order for Born To Live multi-levels tree formation systems to take in new leveraging contributors, those prioritized leveraging contributors who have qualified due scheduled years of leveraging assignments must be graduated out the multi-levels tree systems. So that all others' scheduled prioritized leveraging contributors could go through similar scheduling of fair leveraging treatment assignments.

To describe processes of graduating contributors out of multi-levels tree systems, illustrations here use age range interval tabulation: h in FIG. 6 drawing: 6/8, which age range fall between: 81 to 90.

The processes of graduating contributors out of multi-levels tree systems is also periodically done by the position assignment prioritizing process, during subsequent contributors' age advancement. Whereby the process performs the re-sorting of remaining active leveraging contributors database information.

The position assignment prioritizing process would usually include active leveraging contributors and exclude leveraging contributors' age exceeded the multi-levels tree's age ranges interval tabulations. All eldest age contributors at the top of the oldest age range interval tabulation (for instance, all age 90 contributors at the top of age interval tabulation: h) would be completely graduated out from the multi-levels tree systems at the final year of the contributor's age advancement.

Summary of Inventive Steps

Born To Live manage to mitigate obstacles of exponential broadening base logic, inherent in multi-levels tree formation systems by advocating the following sequence of disclosed intellectual property know-how:— a) Tabulate age ranges interval tabulations for scheduling fair leveraging treatment frequencies at different intervals of the relational multi-levels tree formation, b) pre-sort leveraging contributors' position assignments sequences base on order of age's priorities desire, c) construct levels strengths analysis chart needed for the creating optimal multi-levels tree formation, d) select the desired optimal level: 0's strength from the levels strengths analysis chart to construct optimal Plateau's shape multi-levels trees formation, e) specify the numbers of levels of optimal net accumulative strengths, guided the levels strengths analysis chart in order to construct the numbers of adjacent optimal multi-levels trees formation for managing obstacles of the next insurmountable incremental in multi-levels tree formation systems, f) apply top/down position's assignment pattern whereby assigning leveraging contributors into optimal multi-levels trees,
g) apply adjacent-top/down position's assignment pattern whereby assigning leveraging contributors into adjacent optimal multi-levels trees,
h) periodically perform position assignment prioritizing process to re-schedule fair leveraging assignments for every leveraging contributor, during subsequent contributors' age advancements,
i) subsequently graduate leveraging contributors out of the multi-levels tree formation systems.

PREFERRED EMBODIMENT

Introduction

Prior to the disclosure of the Born To Live there was no known forms of wealth re-distribution solutions that could best describe the usefulness of Born To Live. In order for individuals living in today economic oriented societies to leverage on a fraction of each other's economical strengths, and to periodically be empowered by scheduled forms of monthly supplemental incomes, at head start and at different stages of the life. Herein, the preferred embodiment section present the disclosure of Born To Live intellectual property know-how embodied into forms of collective income-leveraging system solutions.

Embodiment of Born to Live into Forms of Collective Income-Leveraging System Solutions Embodiment Step: 1

Creating the Embodiment's Relational Multi-Levels Tree Contributors' Database.

Setup a copy of leveraging contributors' database with contributors' minimum age of eighteen (18) year old, for creating the Born To Live relational multi-levels tree formation systems by:—
a) Obtain a separate copy of population identities database from registrar of births for intended purpose of automatic inclusion application or,
b) create a separate copy of leveraging contributors' database from existing clients, existing customers' bank accounts, existing policyholder accounts, or associates members' accounts or non-profit organization membership's database etc. . . . for intended purpose of opt-in or opt-out application or,
c) setup online registration to build up a leveraging contributors' database information by publishing an online registration and subscription closing date for intended purpose of masses participation application.

Embodiment Step: 2

Determine the Embodiment's Desired Age Ranges Interval Tabulations.

Typical embodiment here would embody the disclosing intellectual property know-how instructions, to applying a 9 years interval period of for tabulating the desire age ranges interval tabulations, to forming the relational multi-levels tree formation systems, and to schedule qualifying leveraging assignments at different intervals of the multi-levels tree formation systems.

The typical embodiment's age ranges interval tabulation of 9 years period.

| Age Ranges Interval Tabulations | Range | Period |
|---|---|---|
| Age range interval tabulation h: | 81-90 | 9 years |
| Age range interval tabulation g: | 72-80 | 9 years |
| Age range interval tabulation f: | 63-71 | 9 years |
| Age range interval tabulation e: | 54-62 | 9 years |
| Age range interval tabulation d: | 45-53 | 9 years |
| Age range interval tabulation c: | 36-44 | 9 years |
| Age range interval tabulation b: | 27-35 | 9 years |
| Age range interval tabulation a: | 18-26 | 9 years |

Embodiment Step: 3

Pre-Sorting of Contributors' Position Assignment Sequences in the Leveraging Contributors' Database Information.

The typical embodiment here would embody the disclosing intellectual property know-how instructions of, periodically performing the position assignment prioritizing process, based on contributors' active subscriptions status before each leveraging year beings. All non-active contributors including contributors' lapsed active subscriptions and contributors' age exceeded the age ranges interval tabulations would not be included into the position assignment prioritizing process.

The typical embodiment's would subsequently perform the position assignment prioritizing process for both:—
a) leveraging contributors prioritized for qualifying leveraging assignments, base on oldest age priorities throughout the relational multi-levels tree formation systems
b) young leveraging contributors prioritized for qualifying leveraging assignments, base on youngest age priorities throughout the Head Start Young Generations (HSYG) multi-levels tree formation systems.

Embodiment Step: 4

Resolving Position Assignment Priorities' Conflicts for Two or More Contributors Having the Same Birth-Date and Birth-Time.

Given if two or more contributors having the same birth-date and birth-time were encountered, typical embodiment here would embody the disclosing intellectual property know-how instructions, of using an earliest contributor's online system registrations-date-time indicator, to resolve any assignment priority conflict arise.

Embodiment Step: 5

Determine the Embodiment's Contributor Strengths.

Contributor strengths are the numbers of collective child contributors to be assigned to each leveraging contributor. Typical embodiment here would use five (5) as contributor strengths for the relational multi-levels tree formation systems.

Embodiment Step: 6

Determine the Embodiment's Contributor Weights.

Contributor weights are levels of child assignments pre-determined to qualify a leveraging contributor for full leveraging benefits. Otherwise depending on desire total number of collective child contributors' strength assignments use to qualify a full leveraging assignments. Typical embodiment here would use two (2) levels of contributor weights for the relational multi-levels tree formation systems.

This result in a total number of thirty (30) collective child contributors' strength assignments for qualifying a full leveraging assignments, which constitute the strength of five (5) contributors in the qualifying contributor's level: 1 and twenty-five (25) contributors in the qualifying contributor's level: 2.

Embodiment Step: 7

Constructing the Embodiment's Level's Strengths Analysis Chart.

A level's strengths analysis chart is constructed base on the contributor strengths determined. Typical embodiment here would embody the disclosing intellectual property know-how instructions, of constructing a level's strengths analysis chart and use incremental of five (5) to construct the embodiment's level's strengths analysis chart.

The typical embodiment's level's strengths analysis chart construction basing on incremental of five (5).

| Level | Level's Strength | Accumulative Strengths |
|---|---|---|
| 0 | 1 | 1 |
| 1 | 5 | 6 |
| 2 | 25 | 31 |
| 3 | 125 | 156 |
| 4 | 625 | 781 |
| 5 | 3,125 | 3,906 |
| 6 | 15,625 | 19,531 |
| 7 | 78,125 | 97,656 |
| 8 | 390,625 | 488,281 |
| 9 | 1,953,125 | 2,441,406 |
| 10 | 9,765,625 | 12,207,031 |
| 11 | 48,828,125 | 61,035,156 |
| 12 | 244,140,625 | 305,175,781 |

Embodiment Step: 8

Determine the Embodiment's Desired Optimal Level: 0's Strength of Age Range Tabulation, Guided by Using the Level's Strengths Analysis Chart constructed.

Typical embodiment here would embody the disclosing intellectual property know-how instructions, to select level strength of 15,625 in level: 6 of the level's strengths analysis chart to be the optimal level: 0 for all age range tabulations.

This would result in minority accumulative strengths of: 3,906 from level: 0 to level: 5 shown in level's strengths analysis chart, desirably channelled to become base support for the embodied collective age range tabulations.

Embodiment Step: 9

Constructing the Numbers of Adjacent Optimal Age Range Tabulations within Respective Age Range Interval Tabulation for the Embodiment.

Using an automatic detection, computations and assignment functions computer software application developed, for managing the embodied collective income-leveraging system solutions. Typical embodiment here would embody the disclosing intellectual property know-how instructions, of using the adjacent-top/down assignment pattern to assign leveraging contributors into adjacent optimal age range tabulations within respective age range interval tabulation.

Typical embodiment here would also embody the disclosing intellectual property know-how instructions, of using the computed total numbers of contributors within respective age range interval tabulation dividing by the accumulative strengths from level: 6 to level: 9 of the level's strengths analysis chart, for computer software automatic detection functions and computing the total numbers of adjacent optimal age range tabulations required within respective age range interval tabulation.

Embodiment Step: 10

Managing Periodical Positions' Reassignment During Subsequent Contributors' Age Advancement for the Embodiment.

Typical embodiment here would embody the disclosing intellectual property know-how instructions, of periodically performing the position assignment prioritizing process during subsequent contributors' age advancement, whereby the process perform the re-sorting of remaining active leveraging contributors base on age order priorities. The re-sorting processes would practically re-assign every leveraging contributor in the database information into a new assignment sequence.

The position assignment prioritizing process would at the same time identify all oldest age contributors at the top level of respective age range interval tabulation having received duration years of qualified leveraging assignments, to be those posting into the base of successive parent's age range interval tabulation.

Embodiment Step: 11

Graduating Leveraging Contributors Out of Multi-Levels Tree Systems for the Embodiment.

Typical embodiment here would embody the disclosing intellectual property know-how instructions, of periodically performing the position assignment prioritizing process during subsequent contributors' age advancement, whereby the process would also exclude leveraging contributors' age exceeded the multi-levels tree's age ranges interval tabulations.

As the position assignment prioritizing process would not include all non-active contributors and contributors' age exceeded the age ranges interval tabulations, during contributors' age advancement. This would result in all oldest age contributors at the top of the oldest age range interval tabulation (for instance, age range interval tabulation: h) to be completely graduated out from the relational multi-levels tree system at the final year of the contributor's age advancement.

Other Characteristics of the Embodied Collective Income-Leveraging System Solutions Managing Insertion of Leveraging Contributors into the Position Assignment Prioritizing Process In order to be fair to all leveraging contributors contributing faithfully toward respective scheduled qualifying periods. Leveraging contributors are make aware of, in the event of insertion of contributors into the position assignment prioritizing process would required the inserted leveraging contributor to observe 'n' numbers of year of insertion transfers. These inserted leveraging contributors would agree to transfer any assigned qualifying income-leveraging benefits, to the first or subsequent partial qualifying contributors at the lowest level of respective age range tabulation, whom are effected by these insertion displacements.

In the case of the insertion transfer, qualifying leveraging contributor having qualified a full or partial leveraging benefits. The monthly leveraging benefit amount qualified would be divided into numbers of child contributors' benefits and transferred to benefit the first or subsequent partial qualifying contributors at the lowest level of respective age range tabulation, whom are effected by these insertion displacements.

Managing Wills, Accounts' Donations and Entrustments

In order for an income-leveraging society to maximize the social value of respective lifetime income lifeline, active leveraging contributors' account status' holders are allowed to donated, will or entrusted, his or her leveraging account managements and maintenances to designated spouse or the estate, for up to the maximum leveraging age specified.

In the case of single parent of deceased spouse with at least one children below the age of eighteen (18) year old, before the disclosure of Born To Live. The lawful surviving spouse could automatically regain the entrustment of the deceased's leveraging account managements and maintenances prior to the implementation of an income-leveraging society, whereby the living spouse furnishing up the deceased account registration information supported with lawful relationship documents, child birth certificates and the deceased death certificate and etc. . . . . .

As long as these non-living leveraging contributors' active account status' maintenances are actively managed by the living spouse or estate, they would still be managed accordingly in the position assignment prioritizing process.

Stating an Income-Leveraging Standing Policy.

Other characteristics of the embodied collective income-leveraging system solution may include stating an income-leveraging standing policy of:—

1. all leveraging contributors must be minimum eighteen (18) year old and above.
2. each leveraging contributor "may not" pay any registration fee to remain as active or non-active leveraging account holder.
3. each leveraging contributor regardless of qualifying years shall contribute respective leveraging subscription before each leveraging year begins, in order to become active leveraging account status holder.
4. each leveraging contributor shall pay the year's monthly administrative fee together with the year's leveraging subscription in advance, in order to become active leveraging account status holder.
5. each leveraging contributor shall pay any local tax required by the local authority in advance, in order to become active leveraging account status holder.
6. only active leveraging account status' holders would be managed and included into the following year position assignment prioritizing process, during contributors' age advancement.
7. only active leveraging account status' holders could donated, will or entrusted, his or her leveraging account managements and maintenances to designated spouse or estate.
8. each active leveraging account status holder successfully assigned with full qualifying child and sub-child leveraging assignments, would receive the due year long of monthly income-leveraging benefits, computed according to the numbers of qualifying child and sub-child leveraging assignments.
9. each active leveraging account status holder include those partially assigned with child and sub-child leveraging assignments, would also receive the due year long of monthly partial qualifying income-leveraging benefits, computed according to the numbers of qualifying child and sub-child leveraging assignments.
10. each active leveraging account status holder successfully assigned with full qualifying child and sub-child leveraging assignments, shall agree to donate a token of the monthly qualifying leveraging benefits to toward contributing HSYG's objective, as spirit of old empowering back young generations for their congregating roles in supporting economy rejuvenations.
11. each active leveraging account status holder does not required to sponsor any child or sub-child contributors.
12. each active leveraging account status holder does not consumes and does not market any products of any kind.
13. each active leveraging account status holder is not an IBO (Independent Business Owner).
14. each active leveraging account status holder does not qualify leveraging benefits base on commission schemes.
15. leveraging contributors are free to lapse or reinstate respective leveraging account status before each leveraging year begins.
16. leveraging contributors lapsed any particular year's leveraging participation regardless of anticipating a qualifying or non-qualifying periods, would automatically become inactive leveraging account status holder.
17. all inactive leveraging account status' holders would not be managed but excluded from the following year position assignment prioritizing process.
18. inactive leveraging account status' holders cannot donated, will or entrusted, his or her leveraging account managements and maintenances to designated spouse or the estate, otherwise the account is successfully reinstated into active status.
19. leveraging contributors are free to reinstate an inactive leveraging account status before the following leveraging year begins by contributing the respective year's subscription, fee and tax required in advance, in order to become active leveraging account status holder.
20. leveraging contributors are make aware of in the event of reinstating an inactive leveraging account status, these accounts reinstating would incurred insertion of contributors into the position assignment prioritizing process, whereby these age prioritized insertions would result in insertion displacements of others active leveraging account status contributor's position within the collective income-leveraging systems.
21. in order to be fair to all faithful leveraging contributors and to discourage fiscal activities individuals anticipating respective non-qualifying period, to exploiting unfair leveraging practices through irregular participations in the collective income-leveraging systems. A reinstated active leveraging account status holder is required to observe a minimum of numbers of years of insertion transfers for every one (1) year intentional or non-intentional lapse participation, by transferring any assigned qualifying income-leveraging benefits to the first or subsequent partial qualifying contributors at the lowest level of respective age range tabulation, whom are effected by these insertion displacements.
22. leveraging contributors are make aware of in the event of new citizenship conversion would also incurred insertion of the contributor into the position assignment prioritizing process, where by these age prioritized insertions would result in insertion displacements of others active leveraging account status contributor's position within the collective income-leveraging systems. Therefore, inserted active leveraging account status holder of newly converted citizens are require to observe 'n' number of year of insertion transfer, by transferring any assigned qualifying income-leveraging benefits to the first or subsequent partial qualifying contributors at the lowest level of respective age range tabulation, whom are effected by these insertion displacements.

Containing Empowered Errant Labours

Born To Live was never invented to condone errant labours empowered by supplemental incomes. In order for the disclosed intellectual property know-how to be fully useful to societies on a long-term basis, the moral that make the Born To Live invention works include maintaining a sustainable and amicable long-term employers/employees working relationship within economies. Otherwise subjected to respective societies' standards of moral support and backing, the embodiment of the Born To Live into forms of collective income-leveraging system solutions could consider, include putting in place a social rank and file feedback systems. Given necessary, Born To Live strongly recommended it for rejecting particular overwhelming poor social rank and file individuals, from successfully subscribing to the desired collective income-leveraging systems.

This could be suggesting by responses from more than three or more employers' complaints within a holding period of 'n' numbers of years, when such deem necessary rejections could be administrated by informing the individual concerned of the rejection decision, and by crediting back the due paid in advance subscriptions before the leveraging year begin.

Illustrations of Born to Live Embodied into Forms of Collective Income-Leveraging System Solution Starting with societies' minimum age of eighteen (18) year old, Born To Live apply a series of age range interval tabulations with it's contributors' database information and periodically perform position re-assignment, during subsequent contributors' age advancement. Doing so the disclosed intellectual property know-how not only come out with sound solution to mitigate obstacles of exponential broadening base logic, inherent in multi-levels tree formation systems, but it derives a Pareto efficient system solutions for scheduling fair leveraging treatment frequencies. These in term enable all leveraging age groups to inter-qualify respective scheduled income-leveraging benefits at different stages of their life.

No one would be indefinitely left at the bottom of Born To Live multi-levels tree systems, given every leveraging contributor would be periodically re-assigned into a new position throughout Born To Live multi-levels tree formation systems. The newly assigned position would determine the scheduled leveraging income qualifying periods. This is especially for leveraging contributors at and among the older age leveraging contributors with respective age groups.

The embodied income-leveraging system solutions may qualify contributors for respective monthly income-leveraging benefits, base on one or more levels of child and sub-child contributors assigned to the particular contributor's position. Nonetheless leveraging contributors reassigned into a new position, especially those at the base of successive age range interval tabulation may not straight away qualify for any income-leveraging benefit, until they are subsequently reassigned into higher position within respective age range interval tabulation, subsequently during age advancements.

Depending on the numbers of child contributors assigned and are taking up position under the qualifying leveraging contributor, the higher a contributor is re-assigned upward throughout Born To Live age range tabulated multi-level tree formation systems, the nearer one would be qualifying respective scheduled leveraging income benefits. Ultimately every leveraging contributor would be scheduled to go through respective qualifying periods within each age range tabulated group, as older leveraging contributors are posted out into successive parent age range interval tabulations.

Following illustrations use age range interval tabulation: b in FIG. 4 drawing: 4/8, which age range fall between: 27 to 35, to describe the posting of leveraging contributors into successive parent age range interval tabulation.

John was posted into age range interval tabulation: 'b' when John reaches the age of 27 and John would be posted out of age range interval tabulation: 'b' to joining age range interval tabulation: 'c' when John reaches the age of 36. John would also be qualifying his final years of leveraging payout benefits at the age of 35 within age range interval tabulation: 'b'. John would most likely be observing his respective years of leveraging break period at the base of age range interval tabulation: 'c'.

Following tables illustrate the contribution strengths John could receive with a fully qualified scheduled income-leveraging benefit basing on contribution strengths of five (5), with two (2) levels of child and sub-child contributor weight assignments to compute the provisional animal leveraging subscriptions.

| Using contribution strengths of 5 | A: 5 |
|---|---|
| Numbers of Child Contributors: | 5 |
| Numbers of Sub-Child Contributors: | 25 |
| Total Contribution Strengths: | 30 |

Note:

Depending on respective society's standards of living and exchange rate values, actual contributions may vary accordingly. The monthly contributions used here is for illustration purpose only.

Provisional Monthly Subscription

| | |
|---|---|
| John's monthly contributions pay to John's Parent: | $50.00 |
| John's monthly contributions pay to John's Parent's Parent: | $50.00 |
| John's monthly contributions regardless of qualifying year: | $100.00 |

Provisional Annual Fee, Tax and Subscriptions

| | | |
|---|---|---|
| John's annual contributions regardless of qualifying year: | 12 × $100.00 = | $1,200.00 |
| Admin Fee: | 2.00 × 12 = | $24.00 |
| Tax: | 0 | 0 |
| John's "annually subscription" regardless of qualifying year: | — | $1,224.00 |

Computation of Nominal Qualifying Income-Leveraging Benefits

| John's monthly qualifying Income-leveraging benefit payout to John | | John fully Qualified |
|---|---|---|
| John gets from each Child contributor assigned: | $50.00 × 5 = | $250.00 |

-continued

| John's monthly qualifying Income-leveraging benefit payout to John | | John fully Qualified |
|---|---|---|
| John gets from each Sub-Child contributor assigned: | $50.00 × 25 = | $1,250.00 |
| Less HSYG distributed donations rate per Qualifier: | — | ($70.00) |
| John's total "monthly qualifying" Income-leveraging benefit: | — | $1,430.00 |

Illustration here shows how a fully assigned leveraging contributor could be qualifying respective monthly income-leveraging benefit. These certificates could be viewed or download by respective leveraging account holders login at leveraging solution provider's webpage.

Please see following draft certificate for a fully assigned leveraging contributor could look like.

(DRAFT COPY)
Certificate of Leveraging Assignment 2013
Full Assignment

Contributor Account No: 030-7645-8993213
Contributor Name: John
Contact: email address
Leveraging Year: 2013
Account Status: "Reinstated"/"Active"
Position Serial Code: 13-D02B-488280
Position Code: 13-D02B-L08-390625
Parent: D02B-L07-387654
Parent Serial Code: 13-D02B-487232
Qualifying Status: "Full"/"Partial"/"Insertion Transfer"
Insertion Transfer Received: "Yes"/"No"

Assignment Details

| Relation | Name | Position Code (YY-DIV-Level-######) | Position Serial (YY-DIV-######) | Contact |
|---|---|---|---|---|
| Child | Michael | 13-D02B-L09-408621 | 13-D02B-489321 | e-mail |
| Sub-Child | William | 13-D02B-L10-507621 | 13-D02B-491891 | e-mail |
| Sub-Child | Annie | 13-D02B-L10-507622 | 13-D02B-491892 | e-mail |
| Sub-Child | Ruth | 13-D02B-L10-507623 | 13-D02B-491893 | e-mail |
| Sub-Child | Joyce | 13-D02B-L10-507624 | 13-D02B-491894 | e-mail |
| Sub-Child | Vivian | 13-D02B-L10-507625 | 13-D02B-491895 | e-mail |
| Child | Lucy | 13-D02B-L09-408622 | 13-D02B-489322 | e-mail |
| Sub-Child | Roger | 13-D02B-L10-507626 | 13-D02B-491896 | — |
| Sub-Child | Luke | 13-D02B-L10-507627 | 13-D02B-491897 | e-mail |
| Sub-Child | Edward | 13-D02B-L10-507628 | 13-D02B-491898 | e-mail |
| Sub-Child | Kenny | 13-D02B-L10-507629 | 13-D02B-491899 | — |
| Sub-Child | Kris | 13-D02B-L10-507630 | 13-D02B-491900 | e-mail |
| Child | Katherine | 13-D02B-L09-408623 | 13-D02B-489323 | e-mail |
| Sub-Child | Mark | 13-D02B-L10-507631 | 13-D02B-491901 | e-mail |
| Sub-Child | Jane | 13-D02B-L10-507632 | 13-D02B-491902 | — |
| Sub-Child | Keith | 13-D02B-L10-507633 | 13-D02B-491903 | e-mail |
| Sub-Child | Nancy | 13-D02B-L10-507634 | 13-D02B-491904 | e-mail |
| Sub-Child | May | 13-D02B-L10-507635 | 13-D02B-491905 | e-mail |
| Child | Edwin | 13-D02B-L09-408624 | 13-D02B-489324 | — |
| Sub-Child | Louis | 13-D02B-L10-507636 | 13-D02B-491906 | e-mail |
| Sub-Child | Bill | 13-D02B-L10-507637 | 13-D02B-491907 | e-mail |
| Sub-Child | Gilbert | 13-D02B-L10-507638 | 13-D02B-491908 | — |
| Sub-Child | James | 13-D02B-L10-507639 | 13-D02B-491909 | e-mail |
| Sub-Child | Tommy | 13-D02B-L10-507640 | 13-D02B-491910 | e-mail |
| Child | Jonathon | 13-D02B-L09-408625 | 13-D02B-489325 | e-mail |
| Sub-Child | Tony | 13-D02B-L10-507641 | 13-D02B-491911 | e-mail |
| Sub-Child | Charles | 13-D02B-L10-507642 | 13-D02B-491912 | — |
| Sub-Child | Tom | 13-D02B-L10-507643 | 13-D02B-491913 | e-mail |
| Sub-Child | Billy | 13-D02B-L10-507644 | 13-D02B-491914 | e-mail |
| Sub-Child | Lisa | 13-D02B-L10-507645 | 13-D02B-491915 | e-mail |

However given leveraging contributors who are partially assigned with remaining child contributors available would also receive the due income-leveraging benefit from respective partial assigned contributors. Following illustrates a partial assigned income-leveraging benefit computation.

Computation of Nominal Partial Qualifying Income-Leveraging Benefits.

| Jack's partial monthly qualifying payout | | Jack partially Qualified |
|---|---|---|
| When Jack is assigned 5 Child contributors: | $50.00 × 5 = | $250.00 |
| When Jack's is assigned only 19 Sub-Child contributors: | $50.00 × 19 = | $950.00 |
| Less HSYG distributed donations rate per Qualifier:: | — | 0 |
| Jack's total partial monthly qualifying payout: | — | $1,200.00 |

Illustration here shows how partially assigned leveraging contributors could also be receiving the due partial qualifying monthly income-leveraging benefit. These certificates could be viewed or download by respective leveraging account holders at leveraging solution provider's webpage.

Please see following draft certificate for a partial assigned leveraging contributor could look like.

---

(DRAFT COPY)
Certificate of Leveraging Assignment 2013
Partial Assignment

---

Contributor Account No: 030-7645-8993378
Contributor Name: Jack
Contact: email address
Leveraging Year: 2013
Account Status: "Reinstated"/"Active"
Position Serial Code: 13-D02B-488281
Position Code: 13-D02B-L08-390626
Parent: D02B-L07-386352
Parent Serial Code: 13-D02B-486732
Qualifying Status: "Full"/"Partial"/"Insertion Transfer"
Insertion Transfer Received: "Yes"/"No"

---

Assignment Details

| Relation | Name | Position Code (YY-DIV-Level-######) | Position Serial (YY-DIV-######) | Contact |
|---|---|---|---|---|
| Child | Gilbert | 13-D02B-L09-408921 | 13-D02B-489321 | e-mail |
| Sub-Child | Billy | 13-D02B-L10-508621 | 13-D02B-491891 | e-mail |
| Sub-Child | Eileen | 13-D02B-L10-508622 | 13-D02B-491892 | e-mail |
| Sub-Child | Alan | 13-D02B-L10-508623 | 13-D02B-491893 | e-mail |
| Sub-Child | Kelvin | 13-D02B-L10-508624 | 13-D02B-491894 | e-mail |
| Sub-Child | Johnny | 13-D02B-L10-508625 | 13-D02B-491895 | e-mail |
| Child | Willie | 13-D02B-L09-408922 | 13-D02B-489322 | e-mail |
| Sub-Child | Oliver | 13-D02B-L10-508626 | 13-D02B-491896 | — |
| Sub-Child | Alton | 13-D02B-L10-508627 | 13-D02B-491897 | e-mail |
| Sub-Child | Lily | 13-D02B-L10-508628 | 13-D02B-491898 | e-mail |
| Sub-Child | Marry | 13-D02B-L10-508629 | 13-D02B-491899 | — |
| Sub-Child | Paul | 13-D02B-L10-508630 | 13-D02B-491900 | e-mail |
| Child | Evelyn | 13-D02B-L09-408923 | 13-D02B-489323 | e-mail |
| Sub-Child | Jason | 13-D02B-L10-508631 | 13-D02B-491901 | e-mail |
| Sub-Child | Christine | 13-D02B-L10-508632 | 13-D02B-491902 | — |
| Sub-Child | Kristine | 13-D02B-L10-508633 | 13-D02B-491903 | e-mail |
| Sub-Child | Harry | 13-D02B-L10-508634 | 13-D02B-491904 | e-mail |
| Sub-Child | Bobby | 13-D02B-L10-508635 | 13-D02B-491905 | e-mail |
| Child | Jin | 13-D02B-L09-408924 | 13-D02B-489324 | — |
| Sub-Child | Vanessa | 13-D02B-L10-508636 | 13-D02B-491906 | e-mail |
| Sub-Child | Mike | 13-D02B-L10-508637 | 13-D02B-491907 | e-mail |
| Sub-Child | Kenny | 13-D02B-L10-508638 | 13-D02B-491908 | — |
| Sub-Child | Wilson | 13-D02B-L10-508639 | 13-D02B-491909 | e-mail |
| Child | Mindy | 13-D02B-L09-408925 | 13-D02B-489325 | e-mail |

Other characteristics of the embodied collective income-leveraging system solution may also include managing of (HSYG) income-leveraging systems.

What is HSYG?

Given young generations of individuals in income-leveraging societies could start participating in income-leveraging activities at the age of eighteen (18) year old, many would be assigned at the base of the multi-level tree systems. It would not be so soon that these young generations of individuals could immediately qualify for respective scheduled income-leveraging benefits, other than the older leveraging contributors that were based on oldest age order priorities.

Head Start Young Generations (HSYG) is a second tier young generation income-leveraging systems, beside Born To Live income-leveraging system solutions. It is meant to empower young generations individuals joining the economy, especially for the young and to be family makers in societies given a head-start in income-empowerment at the early stage of their life's journey. These initial qualifying opportunities for the young and energetic individuals in societies may start with eighteen (18) year old to a specified age of thirty (30) year old. It could help serve as intermediate forms of income-empowerment stream on top of individuals' initial income capacities, derive from contributing to economy.

HSYG is fuel by leveraging tokens subscription donations derived from leveraging contributors qualifying respective full income-leveraging benefits, agreeing to contribute a fraction of respective qualifying benefits toward realizing HSYG's objective. Instead of assigning HSYG members by oldest age order priorities, HSYG multi-levels tree systems start with youngest age assignment order from: eighteen (18) to thirty (30) year old. Instead of qualifying HSYG members' income-leveraging benefits by oldest age order priorities, HSYG income-leveraging systems qualifies HSYG members by youngest age order priorities.

Given many ageing societies with mushroom's shape population would gradually be hitting population ageing rate above 4.2, average of OECD countries. HSYG income-leveraging solutions is critical at this point, and it would likely works with more qualifying elderly donating toward supporting young individuals shouldering reproductive role in societies.

Deriving the HSYG Token Subscriptions

In order to prevent surplus HSYG leveraging token resources from building up, the total accumulative strengths of HSYG multi-levels tree systems required to qualify all HSYG members for the leveraging year, would be computed for the total required amount of HSYG leveraging token resources, to be donated by qualifying leveraging contributors from the embodied Born To Live income-leveraging system solutions. These donated HSYG leveraging token resources are distributed out as assigned subscriptions to young generations, benefiting from the separate HSYG income-leveraging systems. Young HYSG members within HSYG income-leveraging systems did not physically contribute these HSYG leveraging subscriptions.

Determine the Active Reproductive Period for HSYG Multi-Levels Tree Systems

This is done by assigning a specific age range of young age contributors (suggesting contributing active reproductive period to societies' rejuvenation rate) into another separate HSYG multi-levels tree system. These nominal active reproductive periods of HSYG members age between: eighteen (18) to thirty (30) year old, would be assigned according to the pre-determined contributor strengths and contributor weights basing on youngest age order priorities.

The active reproductive period of respective societies could vary depending on population scale. Also depending on the size of young age contributors' pool within respective societies, these young age HSYG members' age between: eighteen (18) to thirty (30) year old, could be assigned into one or more multiples of optimal HYSG multi-levels trees. HSYG multi-levels tree systems do not require child relationship age range interval Sorting HSYG Members' Position Assignment Sequence within HYSG Multi-Levels Tree Systems The position assignment prioritizing process for HSYG multi-levels trees are pre-sorted according to youngest birthdate, birth-time and system online registration-time priorities instead of oldest birth-date, birth-time and online system registration-time priorities.

Handling Position Assignment Priority Conflict in HSYG Multi-Levels Tree Systems Similarly the position assignment priority conflict handlings for HSYG are handled by the online system registrations-date-time indicator.

Determine the Contributor Strengths and Contributor Weights for HSYG Multi-Levels Tree Systems Similarly the contributor strengths and contributor weights are intended to following the pre-determined contributor strengths and weights from the embodied Born To Live income-leveraging system solutions. HSYG members' leveraging assignments are done sequentially according to the contributor strengths and weights pre-determined.

Managing Periodical Positions' Re-Assignment During Subsequent HSYG Members' Age Advancement for HSYG Multi-Levels Tree Systems This is done annually by identifying oldest age HSYG Members at the "bottom level" of HSYG multi-levels tree systems having received duration years of qualified leveraging benefits, to be those graduating out of the HSYG multi-levels tree systems.

Following descriptions here use FIG. 8 drawing: 8/8 to describe the graduating of HSYG leveraging contributors out of the HSYG multi-levels tree system.

Example

All the age 30 HSYG members in HSYG multi-levels tree systems: "a", "b" and "c" would be graduated out of the HSYG multi-levels tree systems. Similarly for the rest of youngest age HSYG members at the higher level of each HSYG multi-levels tree would also be assigned lower toward to the bottom of respective HSYG multi-levels tree, when their age gradually reached thirty (30) year old When all youngest age HSYG members' positions at the top of respective HSYG multi-levels tree were gradually assigned downward during periodical positions' re-assignment, newer youngest HSYG members age eighteen (18) year old joining the collective income-leveraging system, would be assigned onto the top of these HSYG optimal multi-levels tree systems.

Graduating HSYG Members Out of HSYG Multi-Levels Tree Systems

Older age HSYG members at the bottom of the HSYG multi-levels tree systems example: all age thirty (30) HSYG members at the bottom of HSYG multi-levels tree: "a", "b" and "c" would be completely graduated from the HSYG multi-levels tree system at respective final year of HSYG members' age advancement, whereby their age reached thirty-one (31) year old.

Illustrations of HSYG Income-Leveraging Solutions

Illustration of how HSYG income-leveraging solutions manage to schedule initial income empowerment benefits for young generations of individuals joining the economy.

Determine the HSYG multi-levels tree systems active reproductive period.

Nominal HSYG Active Reproductive Period use in the illustration.

| HSYG | Range | Period |
| --- | --- | --- |
| HSYG Active Reproductive Period | 18-30 | (12 years) |

Using the periodical position assignment prioritizing process, HSYG income-leveraging solution systems would periodically apply re-assigning of HSYG members into a new position. Subsequently during the periodical position assignment prioritizing process for HSYG multi-levels tree systems, youngest HSYG member's age eighteen (18) year old would be admitted and assigned onto the top of HSYG multi-levels tree systems. All older age HSYG members would be subsequently re-assigned into lower position within the HYSG multi-levels tree systems.

HSYG multi-levels tree systems have no partial assignments, all HSYG contributors age between: eighteen (18) year old to thirty (30) year old would be assigned with full qualifying assignments.

Following illustrate how a fully assigned HSYG member could be qualifying respective monthly HSYG income-leveraging benefits.

Computation of HSYG full qualifying income-leveraging benefits.

| HSYG 'Young' | | Qualified |
| --- | --- | --- |
| HSYG 'Young' get from each Child Assigned: | $50.00 × 5 = | $250.00 |
| HSYG 'Young' get from each Sub-Child Assigned: | $50.00 × 25 = | $1,250.00 |
| HSYG 'Young''s total monthly qualifying Income-leveraging benefit: | — | $1,500.00 |

Note:

Depending on respective society's standards of living and exchange rate values. The assigned monthly HSYG token contributions use here is for illustration purpose only. The actual assigned token contributions may vary accordingly.

When HSYG 'Young' age reaches age thirty-one (31) year old, HSYG 'Young' would be graduating out of the HSYG multi-levels trees system at the following year's age advancement. HSYG 'Young' would also be qualifying his final year of HSYG income-leveraging benefits at the age of thirty (30) year old. After then HSYG 'Young' would resume qualifying rest of the income-leveraging benefits within respective age range interval tabulations with the collective income-leveraging system.

Although at the age thirty-one (31) year old, HSYG "Young" could be seen assigned at the bottom of the HSYG multi-levels tree systems. Nonetheless, HYSG "Young" would not be qualifying any HSYG income-leveraging benefits because HYSG "Young" is assigned at the bottom the HSYG multi-levels tree systems as qualifying HSYG leveraging assignments for age thirty (30) and younger HSYG members.

Note:

Child assignments seen overlapping across HSYG members' age older 30 years in FIG. 8 drawing: 8/8 are meant for qualifying age thirty (30) or younger HSYG members with full leveraging assignments. The total accumulative strengths of HSYG multi-levels tree systems required to qualify all HSYG members for the leveraging year should be taken from here, given guided by the level's strengths analysis chart.

Summary of Embodiment Section

The embodiment section have described the usefulness of Born To Live intellectual property know-how given embodied into forms of collective income-leveraging system solutions of its kinds.

In order for such collective income-leveraging system solutions to fulfil Pareto efficient requirements, the disclosed intellectual property know-how must first need to address obstacles of exponential broadening base logic, inherent in multi-levels tree formation systems.

Other than deriving all the necessary inventive steps needed, and solutions for mitigating obstacles of exponential broadening base logic, the embodiment of such collective income-leveraging system solutions also need to fulfil requirements of True Logic Leveraging Systems (TLLS).

The ultimate objective of embodying Born To Live into forms of collective income-leveraging system solutions is, to enabling young generations of individuals living in economic oriented societies to leverage on a fraction of each others' economical strengths as supplemental income empowerment, especially at head start and at different stages of the individuals' life.

To deliver that objective, the wealth of aging societies must also first receive a creditable fiscal empowerment solution, so that when young generations of individuals in societies become old, they too could be empowered back by the power of true leveraging. Only a true logic income-leveraging solution embodied the disclosed intellectual property know-how of Born To Live could make good use of resources derive from division of labour, to maximize the merits and efficiencies of wealth redistributions, and to deliver intermediate liquidity sustainability to the Wealth of the Societies.

SUMMARY OF INVENTION

Herein, the disclosing intellectual property know-how seeking patent has outline and highlighted weaknesses and shortcoming of conventional and advance Multi-levels Arts (MLA) engineering systems, having to work with obstacles of exponential broadening base logic, inherent in multi-levels tree formation systems itself. Born To Live has also explains the difficulties faced in attempting to exploit power of leveraging with multi-levels tree formation systems, due to the physic of exponential broadening base logic.

Born To Live is aware that, any attempt to exploit half-sound or illegitimate power of leveraging with multi-levels tree formation systems, could ultimately faced with obstacles of exponential broadening base logic, inherent in multi-levels tree formation systems. This is because in order to produce marginal proportion of gainers at the top of multi-levels tree formation systems, any attempt to exploit the power of leveraging with half-sound logic would result in infinite unfair treatments on majority contributors at the base of any multi-levels tree systems.

Many professionals in the related field of multi-levels arts technically knew for decades the level of difficulties having to overcome obstacles of exponential broadening base logic, inherent in multi-levels tree formation systems. Despite notions of the technical present of these inherent obstacles, solutions for mitigating obstacles of exponential broadening base logic had remained non-obvious throughout history to the skill's of any prior art or professional's knowledge in the related field.

To date, no multi-levels arts in the related field has claimed to derive any Pareto efficient solutions capable of releasing unfavourable positions at the base of multi-levels tree systems, and none also seem to processes such desire. Other than seen commonly exploiting half-sounded logic or non-Pareto efficient systems of multi-levels trees engineering to achieving a particular desired objectives, many seem incapable of teaching, or instructing out a workable solution for mitigating obstacles of exponential broadening base logic, inherent in multi-levels tree formation systems.

Born To Live does not abolish the good structural gene of multi-levels tree systems, but seeks to fix problems associated with the good gene of multi-levels trees. Other than instructing out solutions for mitigating obstacles of exponential broadening base logic, Born To Live intellectual property know-how has also detailed out for the first time, the necessary solution needed to manage obstacle of the next insurmountable exponential incremental.

Born To Live intellectual property know-how is unique and has all along remained non-obvious to be witnessing for the first time that, instead of pining position holders in multi-levels tree formation systems onto a fixed position. Born To Live intellectual property know-how advocates periodically re-assigning position holders into a new position through series of relational multi-levels tree formation systems. No one other than Born To Live has taught the art for the first time of inter-posting position holders through parent and child relational multi-levels tree formation systems.

These periodical position's re-assignment taught by Born To Live given performed periodically, could subsequently release every position holder in Born To Live multi-levels tree formation systems from their respective contributing position, to resume respective scheduled qualifying position. Given the periodical position's re-assignment of position holders is governed by the human age advancement factor, absolutely no one would be unjustly left at the bottom of Born To Live multi-levels tree formation systems.

While constructively revealing effective steps for harnessing the legitimate power of collective leveraging, it manages to combine the human age advancement relationship factor with multi-levels tree formation systems, to re-inventing and re-engineering it into forms of wealth redistribution system solutions. Whereby said disclosure of intellectual property know-how is presented in step by step manner in the preferred embodiment section. Such forms of wealth redistribution system solutions is intended for empowering the Wealth of the Societies, especially through deriving sources of paid income-leveraging consumers clusters during each payroll cycle.

Born To Live is the only unique form of Pareto efficient multi-levels art, that is capable of unlocking the legitimate power of leveraging with multi-levels tree formation systems. Having successfully derived the Pareto efficient solution for unlocking the legitimate power of leveraging, the intellectual property know-how is complete and competent enough to be embodying into forms of collective income-leveraging system solutions of it kinds, inside the fiscal industries' sectors. Given granted the rights to patent, it harbours the direct and indirect economical role for empowering societies' liquidity sustainability, and to boosting the disposable income capacities' of end consumers to the next higher level, while complementing divisions of labour.

For more information on Born To Live research project, please kindly see the applicant's private research supplementary document:

"Wealth of the Societies" in PDF format

@: https://sites.google.com/site/btlpub/home/documents/

DESCRIPTIONS OF DRAWINGS

Drawing: 1/8 FIG. 1

FIG. 1 illustrates a typical age range interval period of 9 years.

Drawing: 2/8 FIG. 2

FIG. 2 illustrate a single parent and child relationship multi-levels tree formation.

Figure 3:
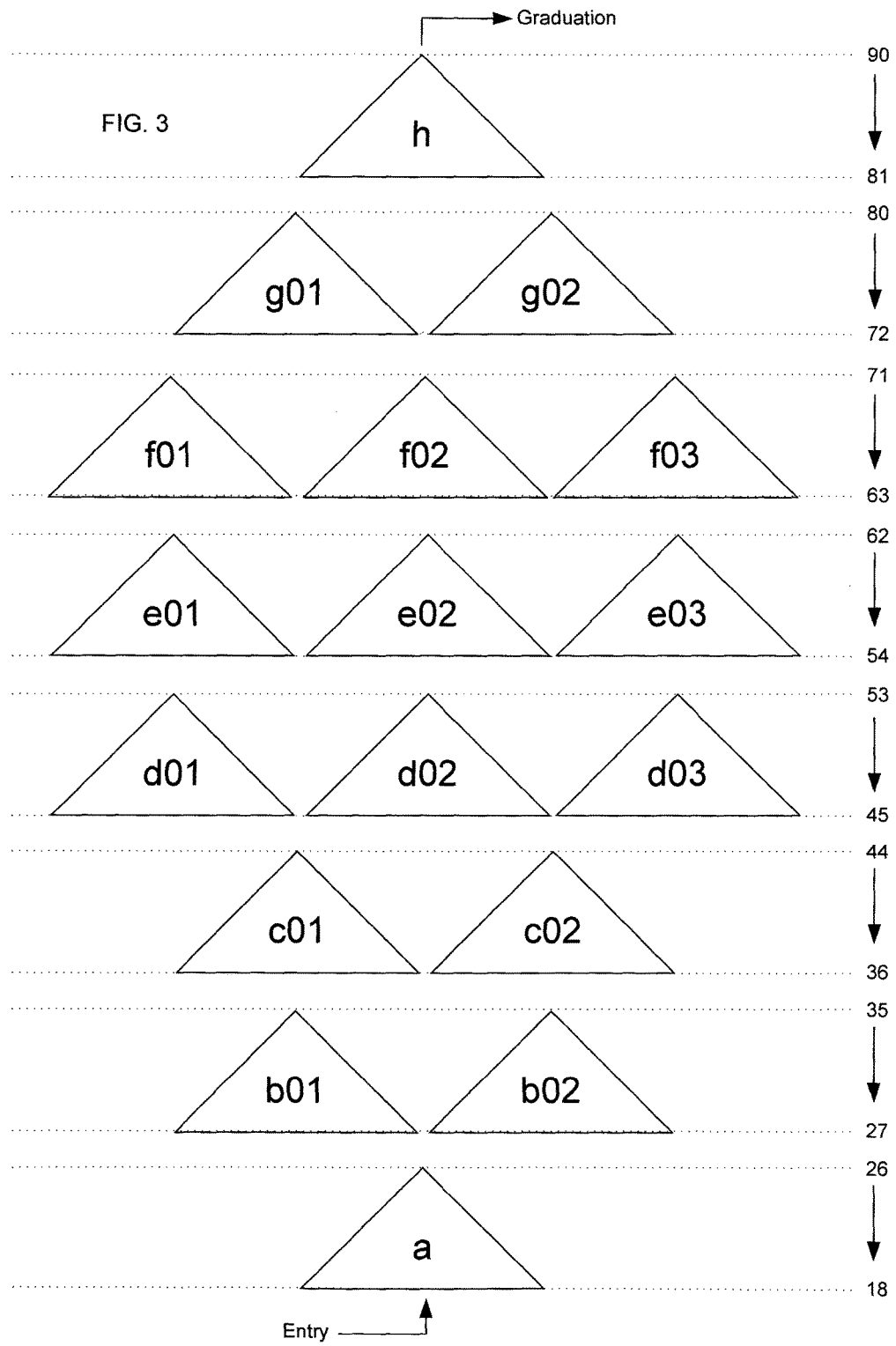

Drawing: 3/8 FIG. 3

FIG. 3 illustrate a combination of single and multiple optimal parent and child relationship multi-levels tree formation.

Drawing: 4/8 FIG. 4

FIG. 4 illustrate typical single optimal age ranges interval tabulations of relational multi-levels tree formation systems.

Contributors after successful registration entry at the age of 17 are assigned into the youngest age range interval tabulations. The position re-assignment posting sequence start in the youngest age range interval tabulations (for instance, age range tabulation: "a").

All active account status's contributors are assigned with a position within respective age range tabulation, using the top/down assignment sequence based on oldest age order priorities. These active account status' contributors would be subsequently re-assigned into a different position within the age range tabulation during age advancements, until they reached the highest age's level within respective age range interval tabulation. After that they would be due for posting into the base of successive parent age range interval tabulation.

All oldest age active account status's contributors reached the highest age's level within each age range interval tabulation would be subsequently posted into a series of next higher parent's age range interval tabulation, until they are finally graduated out of the parent and child relationship multi-levels tree formation systems.

Drawing: 5/8 FIG. 5

FIG. 5 illustrate a typical Level's Strengths Analysis Chart basing on incremental of 5. It has two important functions in the disclosure of Born To Live intellectual property know-how:—
  a) It is use for helping to guide and to pre-determine the optimal level: 0's strength for creating a typical Born To Live multi-levels tree formation systems.
  b) It is use for managing obstacles of the next insurmountable exponential incremental in multi-levels tree formation systems, to pre-determine the numbers of adjacent optimal age range tabulations to be constructed within each age range interval tabulation.

Drawing: 6/8 FIG. 6

FIG. 6 illustrate a typical multiple optimal adjacent age ranges interval tabulations of relational multi-levels tree formation systems.

Contributors after successful registration entry at the age of 17 are assigned into age the youngest age range interval tabulations. The position re-assignment posting sequence start in the youngest age range interval tabulations (for instance, age range tabulation: "a01", "a02" and "a03").

All active account status's contributors are assigned with a position within respective adjacent age range tabulation using the adjacent-top/down assignment sequence based on oldest age order priorities. These active account status' contributors would be subsequently re-assigned into a different position among adjacent age range tabulations during age advancements, until they reached the highest age's level within respective age range interval tabulation. After that they would be due for posting into the base of successive parent age range interval tabulation.

All oldest age active account status's contributors reached the highest age's level within each age range interval tabulation would be subsequently posted into a series of next higher parent's age range interval tabulation, until they are finally graduated out of the parent and child relationship multi-levels tree formation system.

Drawing: 7/8 FIG. 7

FIG. 7 illustrate a typical Single optimal HSYG multi-levels tree formation.

Youngest HSYG members are assigned with a position into the HSYG multi-levels tree systems, using the using the top/down assignment sequence, but based on youngest age order priorities.

As the age of HSYG members advance, they would be subsequently assigned into a new position at the low level of the HSYG multi-levels tree systems. New youngest age HSYG members would be subsequently assigned onto the top of the HSYG multi-levels tree system, based on youngest age order priorities.

HSYG multi-levels tree systems based on youngest age order priorities' assignment sequence do not have parent and child relationship multi-levels tree formation. However HSYG members would stop qualifying HSYG leveraging benefits, whereby the age reached a specific age of (for instance, age: 30).

Drawing: 8/8 FIG. 8

FIG. 8 illustrate a typical multiple Optimal HSYG Multi-levels tree formation.

Youngest HSYG members are assigned with a position across the top of adjacent Optimal HSYG multi-levels tree system, using the adjacent-top/down assignment sequence, but based on youngest age order priorities.

As the age of HSYG members advance, they would be subsequently assigned into a new position at the low level of Optimal HSYG multi-levels trees. New youngest age HSYG members would be subsequently assigned cross the top of adjacent Optimal HSYG multi-levels tree system, based on youngest age order priorities.

Optimal HSYG multi-levels tree systems based on youngest age order priorities' assignment sequence do not have parent and child relationship multi-levels tree formation. However HSYG members would stop qualifying HSYG leveraging benefits, whereby the age reached a specific age of (for instance, age: 30).

The invention claimed is:

1. A computer-implemented method for forming a relational multi-level tree system and positioning entities in the relational multi-level tree system for effecting fair distributions to the entities positioned in the relational multi-level tree system, comprising:

provideing member information of contributing members in a database, wherein the member information includes age information of the contributing members;

defining, by a processor based at least in part on the age information in the database, an optimal number of age range intervals corresponding to levels of an age range tabulation data structure of the relational multi-level tree system, wherein the relational multi-level tree system comprises multi-level trees in the age range tabulation data structure;

pre-sorting, by the processor, the contributing members based on the age information in the database to form an ordered age priority sequence of contributing members' positions in the relational multi-level tree system;

assigning, by the processor using the ordered age priority sequence, the pre-sorted contributing members in their respective age range intervals which correspond to the levels in the age range tabulation data structure by the assignment of positions of contributing members into the multi-level trees in accordance with a level strength analysis chart, wherein the level strength analysis chart includes level strength and level accumulative strength parameters, and assigning the contributing members in a respective age range interval comprises determining an optimal size and number of multi-level trees required to be constructed within the respective age range interval based on a total number of contributing members to be positioned in the age range interval and optimal size considerations made in accordance with the level strength analysis chart, constructing a single multi-level tree or multiple adjacent multi-level trees based on the determination of the optimal size of the single multi-level tree or the optimal size of multiple adjacent multi-level trees required for positioning the total number of contributing members within the age range interval, wherein the single multi-level tree or the multiple adjacent multi-level trees would be constructed based on the optimal size considerations made in accordance with the level strength accumulative parameter of the level strength analysis chart, and assigning the contributing members into their respective positions in the age range interval's single multi-level tree or multiple adjacent multi-level trees by applying top/down or adjacent-top/down assignment of positions of contributing members respectively;

periodically releasing and reassigning, by the processor, contributing members' position into a next higher age range interval in the age range tabulation data structure of the relational multi-level tree system based on the contributing members' age advancement, wherein one or more contributing members' are graduated out of the relational multi-level tree system in the event the one or more contributing members' age exceeds the defined age range intervals; and according, by the processor, fair distributions to the contributing members based on their age-ordered assigned positions in the relational multi-level tree system.

2. The computer-implemented method of claim 1 wherein applying the top/down or adjacent top/down assignment of positions of contributing members based on the optimal size considerations made in accordance with the level strength analysis chart comprises determining an optimal level with corresponding level strength and level accumulative strength parameters in the level strength analysis chart and assigning contributing members into a multi-level tree starting from a top level of the multi-level tree.

3. The computer-implemented method of claim 1 wherein a value of a level strength parameter of a level i in the level strength analysis chart is equal to $5^i$.

4. The computer-implemented method of claim 1 wherein the age range intervals are defined above a threshold age.

5. The computer-implemented method of claim 4 wherein the threshold age is 17 years old.

6. The computer-implemented method of claim 1 wherein pre-sorting the contributing members' position in the relational multi-level tree system into an ordered age priority sequence is based on priority to oldest age in accordance with birth-date and birth-time.

7. The computer-implemented method of claim 1 wherein a unique assignment serial number is assigned to each contributing members' position during the pre-sorting for verification.

8. A computer-implemented method for forming a relational multi-level tree system and positioning entities in the relational multi-level tree system for effecting fair distributions to the entities positioned in the relational multi-level tree system, comprising:

providing member information of contributing members in a database, wherein the member information includes age information of the contributing members;

defining, by a processor based at least in part on the age information in the database, an optimal number of age range intervals corresponding to levels of an age range tabulation data structure of the relational multi-level tree system, wherein the relational multi-level tree system comprises multi-level trees in the age range tabulation data structure;

pre-sorting, by the processor, the contributing members based on the age information in the database to form an ordered age priority sequence of contributing members' positions in the relational multi-level tree system;

assigning, by the processor using the ordered age priority sequence, the pre-sorted contributing members in their respective age range intervals which correspond to the levels in the age range tabulation data structure by the assignment of positions of contributing members into the multi-level trees based on optimal size considerations made in accordance with a level strength analysis chart, wherein the level strength analysis chart includes level strength and level accumulative strength parameters, and a value of a level strength parameter of a level i in the level strength analysis chart is equal to $5^i$ where i is from 0 to 12, and wherein:

for level 0, strength=1 and accumulative strength=1;
for level 1, strength=5 and accumulative strength=6;
for level 2, strength=25 and accumulative strength=31;

for level 3, strength=125 and accumulative strength=156;
for level 4, strength=625 and accumulative strength=781;
for level 5, strength=3,125 and accumulative strength=3,906;
for level 6, strength=15,625 and accumulative strength=19,531;
for level 7, strength=78,125 and accumulative strength=97,656;
for level 8, strength=390,625 and accumulative strength=4,88,281;
for level 9, strength=1,953,125 and accumulative strength=2,441,406;
for level 10, strength=9,765,625 and accumulative strength=12,207,031;
for level 11, strength=48,828,125 and accumulative strength=61,035,156; and
for level 12, strength=244,140,625 and accumulative strength=305,175,781,
wherein assigning the contributing members in a respective age range interval comprises
determining an optimal size and number of multi-level trees to be constructed within the respective age range interval based on a total number of contributing members to be positioned in the age range interval and optimal size considerations made in accordance with the level strength analysis chart,
constructing a single multi-level tree or multiple adjacent multi-level trees based on the determination of the optimal size of the single multi-level tree or the optimal size of multiple adjacent multi-level trees required for positioning the total number of contributing members within the age range interval, wherein the single multi-level tree or the multiple adjacent multi-level trees would be constructed based on the optimal size considerations made in accordance with the level strength accumulative parameter of the level strength analysis chart, and
assigning the contributing members into their respective positions in the age range interval's single multi-level tree or multiple adjacent multi-level trees by applying top/down or adjacent-top/down assignment of positions of contributing members respectively;
periodically releasing and reassigning, by the processor, contributing members' position into a next higher age range interval in the age range tabulation data structure of the relational multi-level tree system based on the contributing members' age advancement, wherein one or more contributing members' are graduated out of the relational multi-level tree system in the event the one or more contributing members' age exceeds the defined age range intervals; and
according, by the processor, fair distributions to the contributing members based on their age-ordered assigned positions in the relational multi-level tree system.

9. The computer-implemented method of claim 8 comprising:
determining a strength of a contributing member; and
determining a weight of a contributing member.

10. The computer-implemented method of claim 9 wherein:
the strength of a contributing member is the number of collective child contributing members assigned to each contributing member per child level;
the weight of a contributing member is the number of levels of child contributing members assigned to each contributing member; and
the number of child contributing members assigned to each contributing member is $X^y+X^{y-1}+X^{y-2}+ \ldots X^1$, wherein X is the strength of a contributing member and y is the weight.

11. The computer-implemented method of claim 10 wherein the strength=5 and weight=2 and the number of child contributing members assigned to each contributing member is $5^2+5^1=30$.

12. The computer-implemented method of claim 10 wherein an optimal number of age range intervals comprises 8 age range intervals which corresponds to 8 levels in the age range tabulation data structure of the relational multi-level tree system.

13. The computer-implemented method of claim 12 wherein:
the first level corresponds to age range of 18-26;
the second level corresponds to age range of 27-35;
the third level corresponds to age range of 36-44;
the fourth level corresponds to age range of 45-53;
the fifth level corresponds to age range of 54-62;
the sixth level corresponds to age range of 63-71;
the seventh level corresponds to age range of 72-80; and
the eighth level corresponds to age range of 81-90.

14. A relational multi-level tree system for effecting fair distributions to entities positioned in the relational multi-level tree system, comprising:
a database for retrieving member information of contributing members, wherein the member information includes age information of the contributing members; and
a processor configured to
define, based at least in part on the age information in the database, an optimal number of age range intervals corresponding to levels of an age range tabulation data structure of the relational multi-level tree system, wherein the relational multi-level tree system comprises multi-level trees in the age range tabulation data structure,
pre-sort the contributing members based on the age information in the database to form an ordered age priority sequence of contributing members' positions in the relational multi-level tree system,
assign, using the ordered age priority sequence, the pre-sorted contributing members in their respective age range intervals which correspond to the levels in the age range tabulation data structure by applying top/down or adjacent top/down assignment of positions of contributing members into the multi-level trees based on optimal size considerations made in accordance with a level strength analysis chart, wherein the level strength analysis chart includes level strength and level accumulative strength parameters, wherein assignment of positions of contributing members into the multi-level trees-comprises constructing structured optimal multi-level trees in a respective age range interval which includes
determining an optimal size and number of adjacent multi-level trees to be constructed within the respective age range interval based on a total number of contributing members to be positioned in the age range interval and optimal size considerations made in accordance with the level strength analysis chart, constructing the determined number of adjacent multi-level trees for positioning the contributing members within the age range interval based on the determined optimal size of multi-level trees, wherein each of the adjacent multi-level trees is constructed in accordance with an optimal level strength accumulative parameter selected from the level strength analysis chart, and assigning the contributing members into their respective positions in the multi-level trees by applying the top/down or adjacent-top/down assignment of positions of contributing members into the multi-level trees constructed within the age range interval, and periodically release and reassign contributing members' position into a next higher age range interval in the age range tabulation data structure of the relational multi-level tree system based on the contributing members' age advancement, wherein one or more contributing members' are graduated out of the relational multi-level tree system in the event the one or more contributing members' age exceeds the defined age range intervals; and performing fair distributions to the contributing members based on their age-ordered assigned positions in the relational multi-level tree system.

15. The system of claim 14 wherein a value of a level strength parameter of a level i in the level strength analysis chart is equal to $5^i$.

16. The system of claim 15 wherein i is from 0 to 12, and wherein:

for level 0, strength=1 and accumulative strength=1;
for level 1, strength=5 and accumulative strength=6;
for level 2, strength=25 and accumulative strength=31;
for level 3, strength=125 and accumulative strength=156;
for level 4, strength=625 and accumulative strength=781;
for level 5, strength=3,125 and accumulative strength=3,906;
for level 6, strength=15,625 and accumulative strength=19,531;
for level 7, strength=78,125 and accumulative strength=97,656;
for level 8, strength=390,625 and accumulative strength=4,88,281;
for level 9, strength=1,953,125 and accumulative strength=2,441,406;
for level 10, strength=9,765,625 and accumulative strength=12,207,031;
for level 11, strength=48,828,125 and accumulative strength=61,035,156; and
for level 12, strength=244,140,625 and accumulative strength=305,175,781.

17. The system of claim 14 wherein an optimal number of age range intervals comprises 8 age range intervals which corresponds to 8 levels in the age range tabulation data structure of the relational multi-level tree system.

18. The system of claim 17 wherein:

the first level corresponds to age range of 18-26;
the second level corresponds to age range of 27-35;
the third level corresponds to age range of 36-44;
the fourth level corresponds to age range of 45-53;
the fifth level corresponds to age range of 54-62;
the sixth level corresponds to age range of 63-71;
the seventh level corresponds to age range of 72-80; and
the eighth level corresponds to age range of 81-90.

19. The system of claim 14 wherein the age range intervals are defined above 17 years old.

20. The system of claim 14 wherein pre-sorting the contributing members' position in the relational multi-level tree system into an ordered age priority sequence is based on priority to oldest age in accordance with birth-date and birth-time.

* * * * *